(12) United States Patent
Agarwal et al.

(10) Patent No.: US 12,012,809 B2
(45) Date of Patent: Jun. 18, 2024

(54) DRILL PIPE TALLY SYSTEM

(71) Applicant: MAGNETIC VARIATION SERVICES LLC, Denver, CO (US)

(72) Inventors: Nishant Agarwal, Denver, CO (US); Todd W. Benson, Dallas, TX (US)

(73) Assignee: MAGNETIC VARIATION SERVICES LLC, Denver, CO (US)

( * ) Notice: Subject to any disclaimer, the term of this patent is extended or adjusted under 35 U.S.C. 154(b) by 455 days.

(21) Appl. No.: 17/073,050

(22) Filed: Oct. 16, 2020

(65) Prior Publication Data

US 2021/0115742 A1 Apr. 22, 2021

Related U.S. Application Data

(60) Provisional application No. 62/916,100, filed on Oct. 16, 2019.

(51) Int. Cl.
| | | |
|---|---|---|
| *E21B 19/24* | (2006.01) | |
| *E21B 3/04* | (2006.01) | |
| *G01D 5/14* | (2006.01) | |
| *E21B 7/04* | (2006.01) | |
| *E21B 44/02* | (2006.01) | |

(52) U.S. Cl.
CPC .............. *E21B 19/24* (2013.01); *E21B 3/04* (2013.01); *G01D 5/14* (2013.01); *E21B 7/04* (2013.01); *E21B 44/02* (2013.01)

(58) Field of Classification Search
CPC ........................................... E21B 19/24
See application file for complete search history.

(56) References Cited

U.S. PATENT DOCUMENTS

| | | | | |
|---|---|---|---|---|
| 3,972,124 A | * | 8/1976 | Mikolajczyk | G01B 3/12 242/615 |
| 4,205,447 A | * | 6/1980 | Smith | G01B 5/043 33/743 |
| 4,481,714 A | * | 11/1984 | Nelson | G01B 5/043 33/772 |
| 7,377,051 B2 | * | 5/2008 | Morris | E21B 47/04 33/736 |
| 7,874,351 B2 | | 1/2011 | Hampton et al. | |
| 7,933,166 B2 | | 4/2011 | Goodman | |

(Continued)

FOREIGN PATENT DOCUMENTS

| | | | | |
|---|---|---|---|---|
| CN | 109538191 A | * | 3/2019 | E21B 47/00 |
| WO | WO-2014007790 A1 | * | 1/2014 | E21B 47/04 |

(Continued)

OTHER PUBLICATIONS

PCT/US2015/060318, "International Search Report and Written Opinion", dated Jan. 28, 2016, 8 pages.

*Primary Examiner* — Matthew R Buck
(74) *Attorney, Agent, or Firm* — Kilpatrick Townsend & Stockton LLP

(57) ABSTRACT

Systems for pipe tallying in well drilling operations and methods for using the same are described. The pipe tallying systems determine a number of pipe joints that pass through an inlet based on the diameter of the pipe joint when compared against a drill pipe diameter. The pipe tally system maintains a tally of drill pipes in a borehole and the pipe tally system can produce a borehole depth measurement based on the length of pipe in the borehole.

23 Claims, 21 Drawing Sheets

(56) References Cited

U.S. PATENT DOCUMENTS

| | | |
|---|---|---|
| 8,218,826 B2 | 7/2012 | Ciglenec et al. |
| 8,233,667 B2 | 7/2012 | Helgason et al. |
| 8,363,101 B2 | 1/2013 | Gschwendtner et al. |
| 8,395,661 B1 | 3/2013 | Olsson et al. |
| 8,547,428 B1 | 10/2013 | Olsson et al. |
| 8,622,128 B2 | 1/2014 | Hegeman |
| 8,812,236 B1 | 8/2014 | Freeman et al. |
| 8,873,806 B2 | 10/2014 | Kiest, Jr. |
| 9,041,794 B1 | 5/2015 | Olsson et al. |
| 9,134,255 B1 | 9/2015 | Olsson et al. |
| 9,279,319 B2 | 3/2016 | Savage |
| 9,410,877 B2 | 8/2016 | Maxey et al. |
| 9,464,492 B2 | 10/2016 | Austefjord et al. |
| 9,518,817 B2 | 12/2016 | Baba et al. |
| 9,651,468 B2 | 5/2017 | Rowe et al. |
| 9,664,011 B2 | 5/2017 | Kruspe et al. |
| 9,677,882 B2 | 6/2017 | Kiest, Jr. |
| 9,706,185 B2 | 7/2017 | Ellis |
| 9,869,145 B2 | 1/2018 | Jones et al. |
| 9,912,918 B2 | 3/2018 | Samuel |
| 9,915,112 B2 | 3/2018 | Geehan et al. |
| 10,082,015 B2 * | 9/2018 | Williams ............... G01D 5/252 |
| 2009/0159294 A1 | 6/2009 | Abdollahi et al. |
| 2010/0328095 A1 | 12/2010 | Hawthorn et al. |
| 2011/0280104 A1 | 11/2011 | McClung, III |
| 2011/0308332 A1 | 12/2011 | Blessum et al. |
| 2012/0123756 A1 | 5/2012 | Wang et al. |
| 2012/0163932 A1 | 6/2012 | Schmidt et al. |
| 2012/0188090 A1 | 7/2012 | Wessling et al. |
| 2013/0345878 A1 | 12/2013 | Austefjord et al. |
| 2014/0002617 A1 | 1/2014 | Zhang et al. |
| 2014/0326505 A1 | 11/2014 | Davis et al. |
| 2015/0114634 A1 | 4/2015 | Limbacher |
| 2015/0138337 A1 | 5/2015 | Tjhang et al. |
| 2015/0218936 A1 | 8/2015 | Maher et al. |
| 2015/0345261 A1 | 12/2015 | Kruspe et al. |
| 2016/0130889 A1 | 5/2016 | Torrione |
| 2017/0089153 A1 | 3/2017 | Teodorescu |
| 2017/0138171 A1 | 5/2017 | Richards et al. |
| 2017/0145807 A1 | 5/2017 | Wendorf et al. |
| 2017/0152729 A1 | 6/2017 | Gleitman et al. |
| 2017/0161885 A1 | 6/2017 | Parmeshwar et al. |
| 2017/0167853 A1 | 6/2017 | Zheng et al. |
| 2017/0284184 A1 | 10/2017 | Anghelescu et al. |
| 2017/0322086 A1 | 11/2017 | Luharuka et al. |
| 2018/0180524 A1 | 6/2018 | Francois et al. |

FOREIGN PATENT DOCUMENTS

| | | |
|---|---|---|
| WO | 2016147045 A1 | 9/2016 |
| WO | 2017042677 A1 | 3/2017 |
| WO | 2017132297 A2 | 8/2017 |
| WO | 2017169225 A1 | 10/2017 |
| WO | 2017176689 A1 | 10/2017 |
| WO | 2017194078 A1 | 11/2017 |
| WO | 2017210033 A1 | 12/2017 |
| WO | 2018067122 A1 | 4/2018 |
| WO | 2018093273 A1 | 5/2018 |
| WO | 2018131485 A1 | 7/2018 |
| WO | 2018148832 A1 | 8/2018 |
| WO | 2018157513 A1 | 9/2018 |

* cited by examiner

PLUNGER UNIT

DRILL PIPE TALLY SYSTEM

CROSS-REFERENCES TO RELATED APPLICATIONS

This application claims priority to and the benefit of U.S. Provisional Application No. 62/916,100, filed Oct. 16, 2019, the entire contents of which is hereby incorporated for all purposes in its entirety.

BACKGROUND

Field of the Disclosure

The present disclosure provides systems and methods useful for integrating reference data for steering a wellbore into one or multiple geological target formations when one or multiple wells have already been drilled in the vicinity. The systems and methods can be computer-implemented using processor executable instructions for execution on a processor and can accordingly be executed with a programmed computer system.

Description of the Related Art

Drilling a borehole for the extraction of minerals has become an increasingly complicated operation due to the increased depth and complexity of many boreholes, including the complexity added by directional drilling. Drilling is an expensive operation and errors in drilling add to the cost and, in some cases, drilling errors may permanently lower the output of a well for years into the future. Conventional technologies and methods may not adequately address the complicated nature of drilling, and may not be capable of gathering and processing various information from downhole sensors and surface control systems in a timely manner, in order to improve drilling operations and minimize drilling errors.

In the oil and gas industry, extraction of hydrocarbon natural resources is done by physically drilling a hole to a reservoir where the hydrocarbon natural resources are trapped. The hydrocarbon natural resources can be up to 10,000 feet or more below the ground surface and be buried under various layers of geological formations. Drilling operations can be conducted by having a rotating drill bit mounted on a bottom hole assembly (BHA) that gives direction to the drill bit for cutting through geological formations and enabled steerable drilling.

A good measure of the hole depth is critical to the economic development of a hydrocarbon asset. Various downhole petrophysical measurements, such as reservoir depth, geological boundaries, and water table levels are based on a common depth reference. Furthermore, various planning work, such as fracking site determination, casing depth planning, and side track points, that is performed from the surface may also be based on the common depth reference.

The determination of hole depth is typically performed using measurements taken by a rig crew member on site with a measuring tape and a tally book. For example, each drill pipe joint is typically measured using a measuring tape, such as when laid down on the pipe rack, either before the pipe is picked for tripping in, or after being pulled out of the hole. Each stand of pipe is typically tracked on a tally book manually immediately before it gets picked up for insertion in the hole. Because manual pipe tallying is an arduous detail oriented process in a fast-paced dynamic environment, the results may often include unwanted gross errors including wrong tally, inaccurate measurements, and mis-communication between rig crew members, which are undesirable and may adversely affect drilling operations.

Accordingly, an error in depth of as little as one foot vertically for TVD can have a significant financial impact in the overall production value from a well. However, despite this primary reliance on depth for drilling and production, the accuracy of depth measurements is typically poorly specified in the oil and gas industry.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
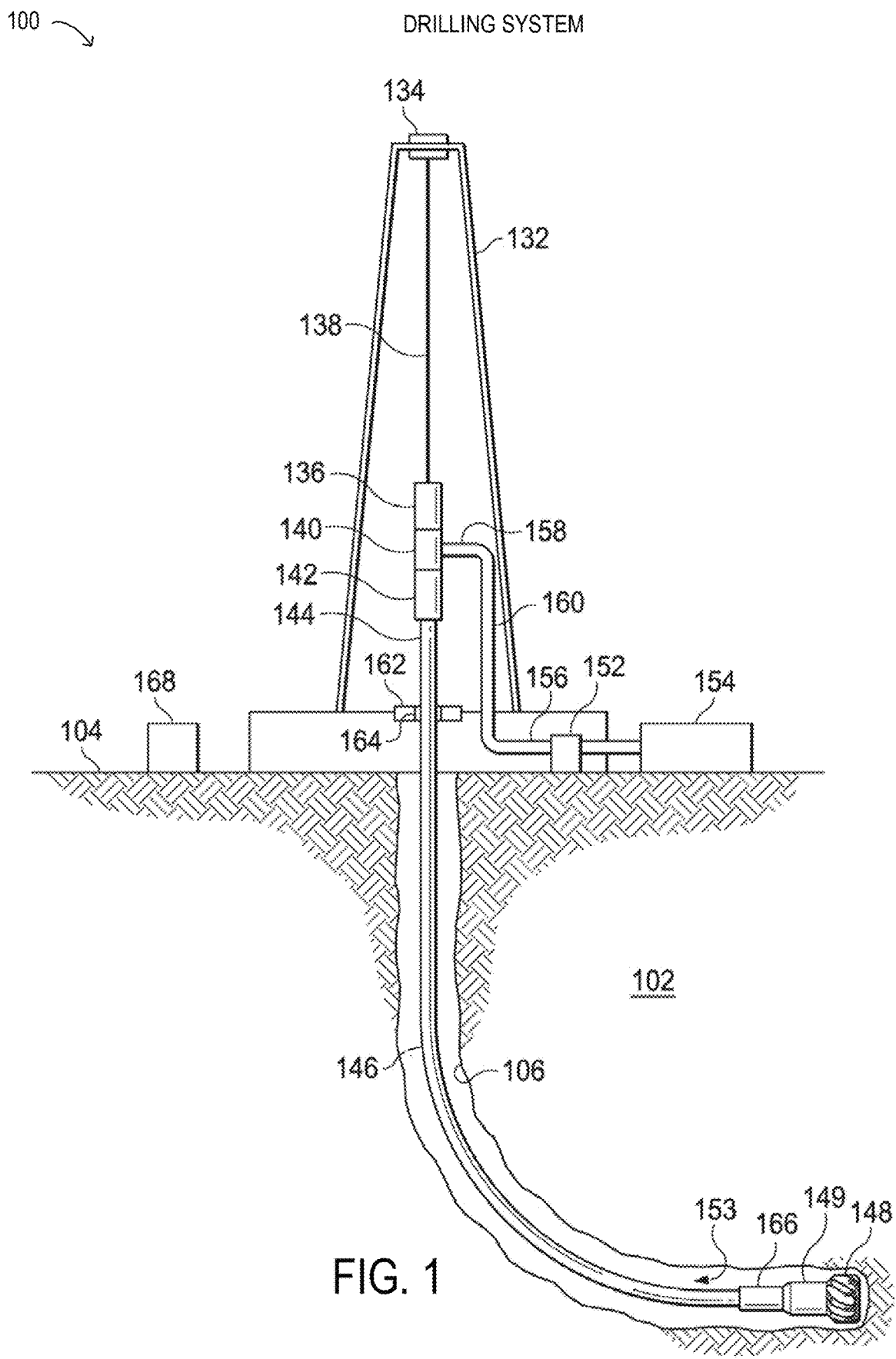
FIG. 1 is a depiction of a drilling system for drilling a borehole.

In the following description, details are set forth by way of example to facilitate discussion of the disclosed subject matter. It is noted, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, as an example (not shown in the drawings), device "12-1" refers to an instance of a device class, which may be referred to collectively as devices "12" and any one of which may be referred to generically as a device "12". In the figures and the description, like numerals are intended to represent like elements.

Drilling a well typically involves a substantial amount of human decision-making during the drilling process. For example, geologists and drilling engineers use their knowledge, experience, and the available information to make decisions on how to plan the drilling operation, how to accomplish the drilling plan, and how to handle issues that arise during drilling. However, even the best geologists and drilling engineers perform some guesswork due to the unique nature of each borehole. Furthermore, a directional human driller performing the drilling may have drilled other boreholes in the same region and so may have some similar experience. However, during drilling operations, a multitude of input information and other factors may affect a drilling decision being made by a human operator or specialist, such that the amount of information may overwhelm the cognitive ability of the human to properly consider and factor into the drilling decision. Furthermore, the quality or the error involved with the drilling decision may improve with larger amounts of input data being considered, for example, such as formation data from a large number of offset wells. For these reasons, human specialists may be unable to achieve desirable drilling decisions, particularly when such drilling decisions are made under time constraints, such as during drilling operations when continuation of drilling is dependent on the drilling decision and, thus, the entire drilling rig waits idly for the next drilling decision. Furthermore, human decision-making for drilling decisions can result in expensive mistakes, because drilling errors can add significant cost to drilling operations. In some cases, drilling errors may permanently lower the output of a well, resulting in substantial long term economic losses due to the lost output of the well.

Therefore, the well plan may be updated based on new stratigraphic information from the wellbore, as it is being drilled. This stratigraphic information can be gained on one hand from measurement while drilling (MWD) and logging while drilling (LWD) sensor data, but could also include other reference well data, such as drilling dynamics data or sensor data giving information, for example, on the hardness of the rock in individual strata layers being drilled through.

A method for updating the well plan with additional stratigraphic data may first combine the various parameters into a single characteristic function, both for the subject well and every offset well. For every pair of subject well and offset well, a heat map can be computed to display the misfit between the characteristic functions of the subject and offset wells. The heat maps may then enable the identification of paths (x(MD), y(MD)), parameterized by the measured depth (MD) along the subject well. These paths uniquely describe the vertical depth of the subject well relative to the geology (e.g., formation) at every offset well. Alternatively, the characteristic functions of the offset wells can be combined into a single characteristic function at the location of the subject wellbore. This combined characteristic function changes along the subject well with changes in the stratigraphy. The heat map may also be used to identify stratigraphic anomalies, such as structural faults, stringers and breccia. The identified paths may be used in updating the well plan with the latest data to steer the wellbore into the geological target(s) and keep the wellbore in the target zone.

Referring now to the drawings, Referring to FIG. 1, a drilling system 100 is illustrated in one embodiment as a top drive system. As shown, the drilling system 100 includes a derrick 132 on the surface 104 of the earth and is used to drill a borehole 106 into the earth. Typically, drilling system 100 is used at a location corresponding to a geographic formation 102 in the earth that is known.

In FIG. 1, derrick 132 includes a crown block 134 to which a travelling block 136 is coupled via a drilling line 138. In drilling system 100, a top drive 140 is coupled to travelling block 136 and may provide rotational force for drilling. A saver sub 142 may sit between the top drive 140 and a drill pipe 144 that is part of a drill string 146. Top drive 140 may rotate drill string 146 via the saver sub 142, which in turn may rotate a drill bit 148 of a bottom hole assembly (BHA) 149 in borehole 106 passing through formation 102. Also visible in drilling system 100 is a rotary table 162 that may be fitted with a master bushing 164 to hold drill string 146 when not rotating.

A mud pump 152 may direct a fluid mixture 153 (e.g., a mud mixture) from a mud pit 154 into drill string 146. Mud pit 154 is shown schematically as a container, but it is noted that various receptacles, tanks, pits, or other containers may be used. Mud 153 may flow from mud pump 152 into a discharge line 156 that is coupled to a rotary hose 158 by a standpipe 160. Rotary hose 158 may then be coupled to top drive 140, which includes a passage for mud 153 to flow into borehole 106 via drill string 146 from where mud 153 may emerge at drill bit 148. Mud 153 may lubricate drill bit 148 during drilling and, due to the pressure supplied by mud pump 152, mud 153 may return via borehole 106 to surface 104.

In drilling system 100, drilling equipment (see also FIG. 5) is used to perform the drilling of borehole 106, such as top drive 140 (or rotary drive equipment) that couples to drill string 146 and BHA 149 and is configured to rotate drill string 146 and apply pressure to drill bit 148. Drilling system 100 may include control systems such as a WOB/differential pressure control system 522, a positional/rotary control system 524, a fluid circulation control system 526, and a sensor system 528, as further described below with respect to FIG. 5. The control systems may be used to monitor and change drilling rig settings, such as the WOB or differential pressure to alter the ROP or the radial orientation of the toolface, change the flow rate of drilling mud, and perform other operations. Sensor system 528 may be for obtaining sensor data about the drilling operation and drilling system 100, including the downhole equipment. For example, sensor system 528 may include MWD or logging while drilling (LWD) tools for acquiring information, such as toolface and formation logging information, that may be saved for later retrieval, transmitted with or without a delay using any of various communication means (e.g., wireless, wireline, or mud pulse telemetry), or otherwise transferred to steering control system 168. As used herein, an MWD tool is enabled to communicate downhole measurements without substantial delay to the surface 104, such as using mud pulse telemetry, while a LWD tool is equipped with an internal memory that stores measurements when downhole and can be used to download a stored log of measurements when the LWD tool is at the surface 104. The internal memory in the LWD tool may be a removable memory, such as a universal serial bus (USB) memory device or another removable memory device. It is noted that certain downhole tools may have both MWD and LWD capabilities. Such information acquired by sensor system 528 may include information related to hole depth, bit depth, inclination angle, azimuth angle, true vertical depth, gamma count, standpipe pressure, mud flow rate, rotary rotations per minute (RPM), bit speed, ROP, WOB, among other information. It is noted that all or part of sensor system 528 may be incorporated into a control system, or in another component of the drilling equipment. As drilling system 100 can be configured in many different implementations, it is noted that different control systems and subsystems may be used.

Sensing, detection, measurement, evaluation, storage, alarm, and other functionality may be incorporated into a downhole tool 166 or BHA 149 or elsewhere along drill string 146 to provide downhole surveys of borehole 106. Accordingly, downhole tool 166 may be an MWD tool or a LWD tool or both, and may accordingly utilize connectivity to the surface 104, local storage, or both. In different implementations, gamma radiation sensors, magnetometers, accelerometers, and other types of sensors may be used for the downhole surveys. Although downhole tool 166 is shown in singular in drilling system 100, it is noted that multiple instances (not shown) of downhole tool 166 may be located at one or more locations along drill string 146.

In some embodiments, formation detection and evaluation functionality may be provided via a steering control system 168 on the surface 104. Steering control system 168 may be located in proximity to derrick 132 or may be included with drilling system 100. In other embodiments, steering control system 168 may be remote from the actual location of borehole 106 (see also FIG. 4). For example, steering control system 168 may be a stand-alone system or may be incorporated into other systems included with drilling system 100.

In operation, steering control system 168 may be accessible via a communication network (see also FIG. 10), and may accordingly receive formation information via the communication network. In some embodiments, steering control system 168 may use the evaluation functionality to provide corrective measures, such as a convergence plan to overcome an error in the well trajectory of borehole 106 with respect to a reference, or a planned well trajectory. The convergence plans or other corrective measures may depend on a determination of the well trajectory, and therefore, may be improved in accuracy using surface steering, as disclosed herein.

In particular embodiments, at least a portion of steering control system 168 may be located in downhole tool 166 (not shown). In some embodiments, steering control system 168 may communicate with a separate controller (not shown) located in downhole tool 166. In particular, steering control system 168 may receive and process measurements received from downhole surveys, and may perform the calculations described herein for surface steering using the downhole surveys and other information referenced herein.

In drilling system 100, to aid in the drilling process, data is collected from borehole 106, such as from sensors in BHA 149, downhole tool 166, or both. The collected data may include the geological characteristics of formation 102 in which borehole 106 was formed, the attributes of drilling system 100, including BHA 149, and drilling information such as weight-on-bit (WOB), drilling speed, and other information pertinent to the formation of borehole 106. The drilling information may be associated with a particular depth or another identifiable marker to index collected data. For example, the collected data for borehole 106 may capture drilling information indicating that drilling of the well from 1,000 feet to 1,200 feet occurred at a first rate of penetration (ROP) through a first rock layer with a first WOB, while drilling from 1,200 feet to 1,500 feet occurred at a second ROP through a second rock layer with a second WOB (see also FIG. 2). In some applications, the collected data may be used to virtually recreate the drilling process that created borehole 106 in formation 102, such as by displaying a computer simulation of the drilling process. The accuracy with which the drilling process can be recreated depends on a level of detail and accuracy of the collected data, including collected data from a downhole survey of the well trajectory.

The collected data may be stored in a database that is accessible via a communication network for example. In some embodiments, the database storing the collected data for borehole 106 may be located locally at drilling system 100, at a drilling hub that supports a plurality of drilling systems 100 in a region, or at a database server accessible over the communication network that provides access to the database (see also FIG. 4). At drilling system 100, the collected data may be stored at the surface 104 or downhole in drill string 146, such as in a memory device included with BHA 149 (see also FIG. 10). Alternatively, at least a portion of the collected data may be stored on a removable storage medium, such as using steering control system 168 or BHA 149, that is later coupled to the database in order to transfer the collected data to the database, which may be manually performed at certain intervals, for example.

In FIG. 1, steering control system 168 is located at or near the surface 104 where borehole 106 is being drilled. Steering control system 168 may be coupled to equipment used in drilling system 100 and may also be coupled to the database, whether the database is physically located locally, regionally, or centrally (see also FIGS. 4 and 5). Accordingly, steering control system 168 may collect and record various inputs, such as measurement data from a magnetometer and an accelerometer that may also be included with BHA 149.

Steering control system 168 may further be used as a surface steerable system, along with the database, as described above. The surface steerable system may enable an operator to plan and control drilling operations while drilling is being performed. The surface steerable system may itself also be used to perform certain drilling operations, such as controlling certain control systems that, in turn, control the actual equipment in drilling system 100 (see also FIG. 5). The control of drilling equipment and drilling operations by steering control system 168 may be manual, manual-assisted, semi-automatic, or automatic, in different embodiments.

Manual control may involve direct control of the drilling rig equipment, albeit with certain safety limits to prevent unsafe or undesired actions or collisions of different equipment. To enable manual-assisted control, steering control system 168 may present various information, such as using a graphical user interface (GUI) displayed on a display device (see FIG. 8), to a human operator, and may provide controls that enable the human operator to perform a control operation. The information presented to the user may include live measurements and feedback from the drilling rig and steering control system 168, or the drilling rig itself, and may further include limits and safety-related elements to prevent unwanted actions or equipment states, in response to a manual control command entered by the user using the GUI.

To implement semi-automatic control, steering control system 168 may itself propose or indicate to the user, such as via the GUI, that a certain control operation, or a sequence of control operations, should be performed at a given time. Then, steering control system 168 may enable the user to imitate the indicated control operation or sequence of control operations, such that once manually started, the indicated control operation or sequence of control operations is automatically completed. The limits and safety features mentioned above for manual control would still apply for semi-automatic control. It is noted that steering control system 168 may execute semi-automatic control using a secondary processor, such as an embedded controller that executes under a real-time operating system (RTOS), that is under the control and command of steering control system 168. To implement automatic control, the step of manual starting the indicated control operation or sequence of operations is eliminated, and steering control system 168 may proceed with only a passive notification to the user of the actions taken.

In order to implement various control operations, steering control system 168 may perform (or may cause to be performed) various input operations, processing operations, and output operations. The input operations performed by steering control system 168 may result in measurements or other input information being made available for use in any subsequent operations, such as processing or output operations. The input operations may accordingly provide the input information, including feedback from the drilling process itself, to steering control system 168. The processing operations performed by steering control system 168 may be any processing operation associated with surface steering, as disclosed herein. The output operations performed by steering control system 168 may involve generating output information for use by external entities, or for output to a user, such as in the form of updated elements in the GUI, for example. The output information may include at least some of the input information, enabling steering control system 168 to distribute information among various entities and processors.

In particular, the operations performed by steering control system 168 may include operations such as receiving drilling data representing a drill path, receiving other drilling parameters, calculating a drilling solution for the drill path based on the received data and other available data (e.g., rig characteristics), implementing the drilling solution at the drilling rig, monitoring the drilling process to gauge whether the drilling process is within a defined margin of error of the drill path, and calculating corrections for the drilling process if the drilling process is outside of the margin of error.

Accordingly, steering control system 168 may receive input information either before drilling, during drilling, or after drilling of borehole 106. The input information may comprise measurements from one or more sensors, as well as survey information collected while drilling borehole 106. The input information may also include a well plan, a regional formation history, drilling engineer parameters, downhole tool face/inclination information, downhole tool gamma/resistivity information, economic parameters, reliability parameters, among various other parameters. Some of the input information, such as the regional formation history, may be available from a drilling hub 410, which may have respective access to a regional drilling database (DB) 412 (see FIG. 4). Other input information may be accessed or uploaded from other sources to steering control system 168. For example, a web interface may be used to interact directly with steering control system 168 to upload the well plan or drilling parameters.

As noted, the input information may be provided to steering control system 168. After processing by steering control system 168, steering control system 168 may generate control information that may be output to drilling rig 210 (e.g., to rig controls 520 that control drilling equipment 530, see also FIGS. 2 and 5). Drilling rig 210 may provide feedback information using rig controls 520 to steering control system 168. The feedback information may then serve as input information to steering control system 168, thereby enabling steering control system 168 to perform feedback loop control and validation. Accordingly, steering control system 168 may be configured to modify its output information to drilling rig 210, in order to achieve the desired results, which are indicated in the feedback information. The output information generated by steering control system 168 may include indications to modify one or more drilling parameters, the direction of drilling, the drilling mode, among others. In certain operational modes, such as semi-automatic or automatic, steering control system 168 may generate output information indicative of instructions to rig controls 520 to enable automatic drilling using the latest location of BHA 149. Therefore, an improved accuracy in the determination of the location of BHA 149 may be provided using steering control system 168, along with the methods and operations for surface steering disclosed herein.

Figure 2:
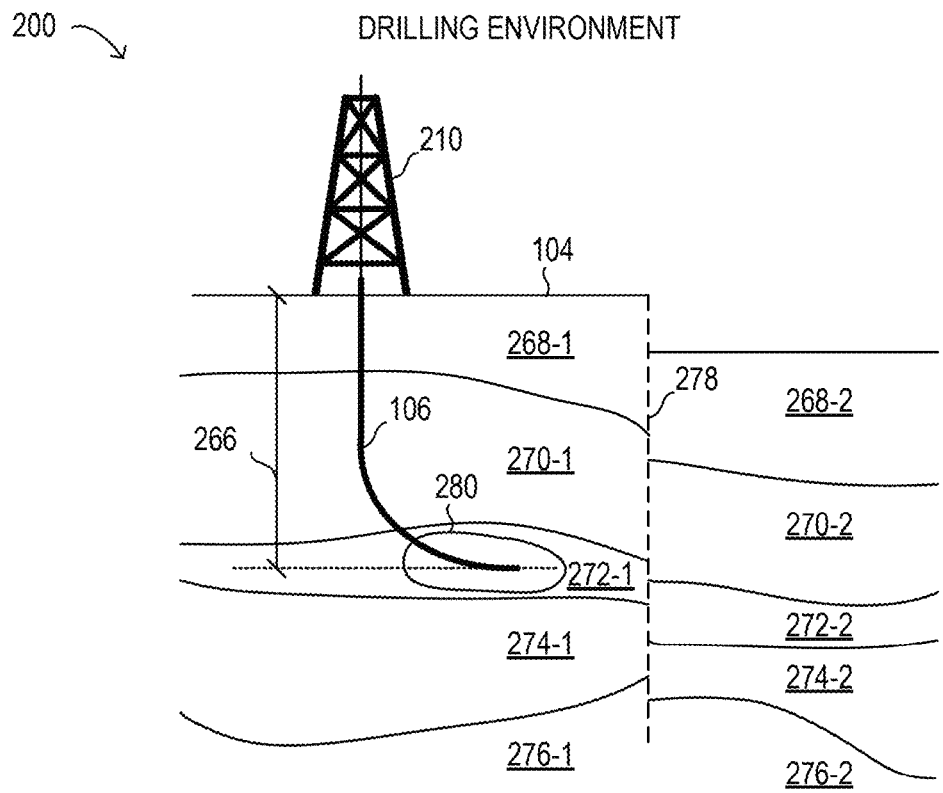
FIG. 2 is a depiction of a drilling environment including the drilling system for drilling a borehole.

Referring now to FIG. 2, a drilling environment 200 is depicted schematically and is not drawn to scale or perspective. In particular, drilling environment 200 may illustrate additional details with respect to formation 102 below the surface 104 in drilling system 100 shown in FIG. 1. In FIG. 2, drilling rig 210 may represent various equipment discussed above with respect to drilling system 100 in FIG. 1 that is located at the surface 104.

In drilling environment 200, it may be assumed that a drilling plan (also referred to as a well plan) has been formulated to drill borehole 106 extending into the ground to a true vertical depth (TVD) 266 and penetrating several subterranean strata layers. Borehole 106 is shown in FIG. 2 extending through strata layers 268-1 and 270-1, while terminating in strata layer 272-1. Accordingly, as shown, borehole 106 does not extend or reach underlying strata layers 274-1 and 276-1. A target area 280 specified in the drilling plan may be located in strata layer 272-1 as shown in FIG. 2. Target area 280 may represent a desired endpoint of borehole 106, such as a hydrocarbon producing area indicated by strata layer 272-1. It is noted that target area 280 may be of any shape and size, and may be defined using various different methods and information in different embodiments. In some instances, target area 280 may be specified in the drilling plan using subsurface coordinates, or references to certain markers, that indicate where borehole 106 is to be terminated. In other instances, target area may be specified in the drilling plan using a depth range within which borehole 106 is to remain. For example, the depth range may correspond to strata layer 272-1. In other examples, target area 280 may extend as far as can be realistically drilled. For example, when borehole 106 is specified to have a horizontal section with a goal to extend into strata layer 172 as far as possible, target area 280 may be defined as strata layer 272-1 itself and drilling may continue until some other physical limit is reached, such as a property boundary or a physical limitation to the length of drill string 146.

Also visible in FIG. 2 is a fault line 278 that has resulted in a subterranean discontinuity in the fault structure. Specifically, strata layers 268, 270, 272, 274, and 276 have portions on either side of fault line 278. On one side of fault line 278, where borehole 106 is located, strata layers 268-1, 270-1, 272-1, 274-1, and 276-1 are unshifted by fault line 278. On the other side of fault line 278, strata layers 268-2, are shifted downwards by fault line 278.

Current drilling operations frequently include directional drilling to reach a target, such as target area 280. The use of directional drilling has been found to generally increase an overall amount of production volume per well, but also may lead to significantly higher production rates per well, which are both economically desirable. As shown in FIG. 2, directional drilling may be used to drill the horizontal portion of borehole 106, which increases an exposed length of borehole 106 within strata layer 272-1, and which may accordingly be beneficial for hydrocarbon extraction from strata layer 272-1. Directional drilling may also be used to alter an angle of borehole 106 to accommodate subterranean faults, such as indicated by fault line 278 in FIG. 2. Other benefits that may be achieved using directional drilling include sidetracking off of an existing well to reach a different target area or a missed target area, drilling around abandoned drilling equipment, drilling into otherwise inaccessible or difficult to reach locations (e.g., under populated areas or bodies of water), providing a relief well for an existing well, and increasing the capacity of a well by branching off and having multiple boreholes extending in different directions or at different vertical positions for the same well. Directional drilling is often not limited to a straight horizontal borehole 106, but may involve staying within a strata layer that varies in depth and thickness as illustrated by strata layer 272. As such, directional drilling may involve multiple vertical adjustments that complicate the trajectory of borehole 106.

Figure 3:
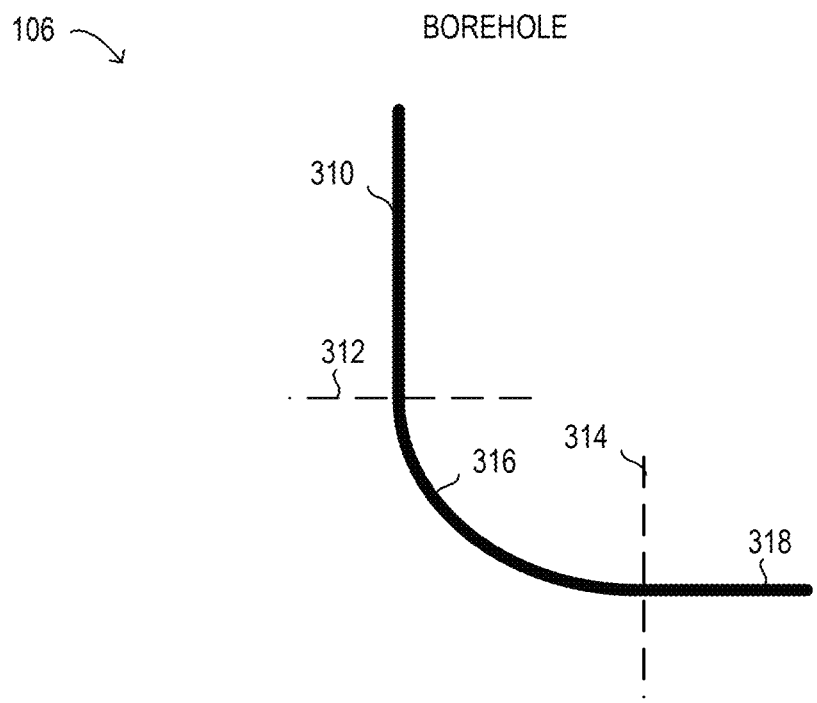
FIG. 3 is a depiction of a borehole generated in the drilling environment.

Referring now to FIG. 3, one embodiment of a portion of borehole 106 is shown in further detail. Using directional drilling for horizontal drilling may introduce certain challenges or difficulties that may not be observed during vertical drilling of borehole 106. For example, a horizontal portion 318 of borehole 106 may be started from a vertical portion 310. In order to make the transition from vertical to horizontal, a curve may be defined that specifies a so-called "build up" section 316. Build up section 316 may begin at a kick off point 312 in vertical portion 310 and may end at a begin point 314 of horizontal portion 318. The change in inclination angle in build up section 316 per measured length drilled is referred to herein as a "build rate" and may be defined in degrees per one hundred feet drilled. For example, the build rate may have a value of 6°/100 ft., indicating that there is a six degree change in inclination angle for every one hundred feet drilled. The build rate for a particular build up section may remain relatively constant or may vary.

The build rate used for any given build up section may depend on various factors, such as properties of the formation (i.e., strata layers) through which borehole 106 is to be drilled, the trajectory of borehole 106, the particular pipe and drill collars/BHA components used (e.g., length, diameter, flexibility, strength, mud motor bend setting, and drill bit), the mud type and flow rate, the specified horizontal displacement, stabilization, and inclination angle, among other factors. An overly aggressive built rate can cause problems such as severe doglegs (e.g., sharp changes in direction in the borehole) that may make it difficult or impossible to run casing or perform other operations in borehole 106. Depending on the severity of any mistakes made during directional drilling, borehole 106 may be enlarged or drill bit 146 may be backed out of a portion of borehole 106 and redrilled along a different path. Such mistakes may be undesirable due to the additional time and expense involved. However, if the built rate is too cautious, additional overall time may be added to the drilling process, because directional drilling generally involves a lower ROP than straight drilling. Furthermore, directional drilling for a curve is more complicated than vertical drilling and the possibility of drilling errors increases with directional drilling (e.g., overshoot and undershoot that may occur while trying to keep drill bit 148 on the planned trajectory).

Two modes of drilling, referred to herein as "rotating" and "sliding", are commonly used to form borehole 106. Rotating, also called "rotary drilling", uses top drive 140 or rotary table 162 to rotate drill string 146. Rotating may be used when drilling occurs along a straight trajectory, such as for vertical portion 310 of borehole 106. Sliding, also called "steering" or "directional drilling" as noted above, typically uses a mud motor located downhole at BHA 149. The mud motor may have an adjustable bent housing and is not powered by rotation of drill string 146. Instead, the mud motor uses hydraulic power derived from the pressurized drilling mud that circulates along borehole 106 to and from the surface 104 to directionally drill borehole 106 in build up section 316.

Thus, sliding is used in order to control the direction of the well trajectory during directional drilling. A method to perform a slide may include the following operations. First, during vertical or straight drilling, the rotation of drill string 146 is stopped. Based on feedback from measuring equipment, such as from downhole tool 166, adjustments may be made to drill string 146, such as using top drive 140 to apply various combinations of torque, WOB, and vibration, among other adjustments. The adjustments may continue until a tool face is confirmed that indicates a direction of the bend of the mud motor is oriented to a direction of a desired deviation (i.e., build rate) of borehole 106. Once the desired orientation of the mud motor is attained, WOB to the drill bit is increased, which causes the drill bit to move in the desired direction of deviation. Once sufficient distance and angle have been built up in the curved trajectory, a transition back to rotating mode can be accomplished by rotating drill string 146 again. The rotation of drill string 146 after sliding may neutralize the directional deviation caused by the bend in the mud motor due to the continuous rotation around a centerline of borehole 106.

Figure 4:
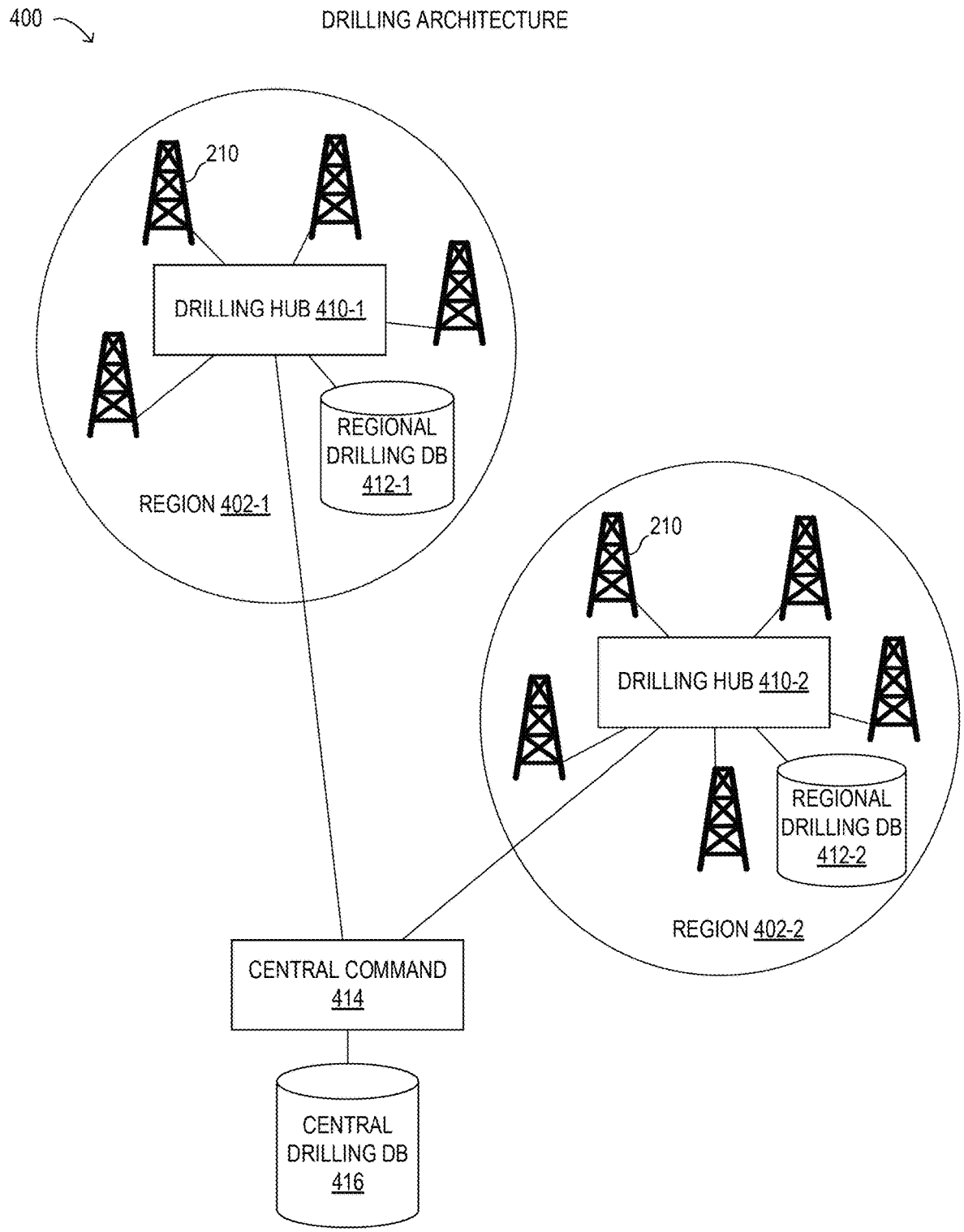
FIG. 4 is a depiction of a drilling architecture including the drilling environment.

Referring now to FIG. 4, a drilling architecture 400 is illustrated in diagram form. As shown, drilling architecture 400 depicts a hierarchical arrangement of drilling hubs 410 and a central command 414, to support the operation of a plurality of drilling rigs 210 in different regions 402. Specifically, as described above with respect to FIGS. 1 and 2, drilling rig 210 includes steering control system 168 that is enabled to perform various drilling control operations locally to drilling rig 210. When steering control system 168 is enabled with network connectivity, certain control operations or processing may be requested or queried by steering control system 168 from a remote processing resource. As shown in FIG. 4, drilling hubs 410 represent a remote processing resource for steering control system 168 located at respective regions 402, while central command 414 may represent a remote processing resource for both drilling hub 410 and steering control system 168.

Specifically, in a region 402-1, a drilling hub 410-1 may serve as a remote processing resource for drilling rigs 210 located in region 402-1, which may vary in number and are not limited to the exemplary schematic illustration of FIG. 4. Additionally, drilling hub 410-1 may have access to a regional drilling DB 412-1, which may be local to drilling hub 410-1. Additionally, in a region 402-2, a drilling hub 410-2 may serve as a remote processing resource for drilling rigs 210 located in region 402-2, which may vary in number and are not limited to the exemplary schematic illustration of FIG. 4. Additionally, drilling hub 410-2 may have access to a regional drilling DB 412-2, which may be local to drilling hub 410-2.

In FIG. 4, respective regions 402 may exhibit the same or similar geological formations. Thus, reference wells, or offset wells, may exist in a vicinity of a given drilling rig 210 in region 402, or where a new well is planned in region 402. Furthermore, multiple drilling rigs 210 may be actively drilling concurrently in region 402, and may be in different stages of drilling through the depths of formation strata layers at region 402. Thus, for any given well being drilled by drilling rig 210 in a region 402, survey data from the reference wells or offset wells may be used to create the well plan, and may be used for surface steering, as disclosed herein. In some implementations, survey data or reference data from a plurality of reference wells may be used to improve drilling performance, such as by reducing an error in estimating TVD or a position of BHA 149 relative to one or more strata layers, as will be described in further detail herein. Additionally, survey data from recently drilled wells, or wells still currently being drilled, including the same well, may be used for reducing an error in estimating TVD or a position of BHA 149 relative to one or more strata layers.

Also shown in FIG. 4 is central command 414, which has access to central drilling DB 416, and may be located at a centralized command center that is in communication with drilling hubs 410 and drilling rigs 210 in various regions 402. The centralized command center may have the ability to monitor drilling and equipment activity at any one or more drilling rigs 210. In some embodiments, central command 414 and drilling hubs 412 may be operated by a commercial operator of drilling rigs 210 as a service to customers who have hired the commercial operator to drill wells and provide other drilling-related services.

In FIG. 4, it is particularly noted that central drilling DB 416 may be a central repository that is accessible to drilling hubs 410 and drilling rigs 210. Accordingly, central drilling DB 416 may store information for various drilling rigs 210 in different regions 402. In some embodiments, central drilling DB 416 may serve as a backup for at least one regional drilling DB 412, or may otherwise redundantly store information that is also stored on at least one regional drilling DB 412. In turn, regional drilling DB 412 may serve as a backup or redundant storage for at least one drilling rig 210 in region 402. For example, regional drilling DB 412 may store information collected by steering control system 168 from drilling rig 210.

In some embodiments, the formulation of a drilling plan for drilling rig 210 may include processing and analyzing the collected data in regional drilling DB 412 to create a more effective drilling plan. Furthermore, once the drilling has begun, the collected data may be used in conjunction with current data from drilling rig 210 to improve drilling decisions. As noted, the functionality of steering control system 168 may be provided at drilling rig 210, or may be provided, at least in part, at a remote processing resource, such as drilling hub 410 or central command 414.

As noted, steering control system 168 may provide functionality as a surface steerable system for controlling drilling rig 210. Steering control system 168 may have access to regional drilling DB 412 and central drilling DB 416 to provide the surface steerable system functionality. As will be described in greater detail below, steering control system 168 may be used to plan and control drilling operations based on input information, including feedback from the drilling process itself. Steering control system 168 may be used to perform operations such as receiving drilling data representing a drill trajectory and other drilling parameters, calculating a drilling solution for the drill trajectory based on the received data and other available data (e.g., rig characteristics), implementing the drilling solution at drilling rig 210, monitoring the drilling process to gauge whether the drilling process is within a margin of error that is defined for the drill trajectory, or calculating corrections for the drilling process if the drilling process is outside of the margin of error.

Figure 5:
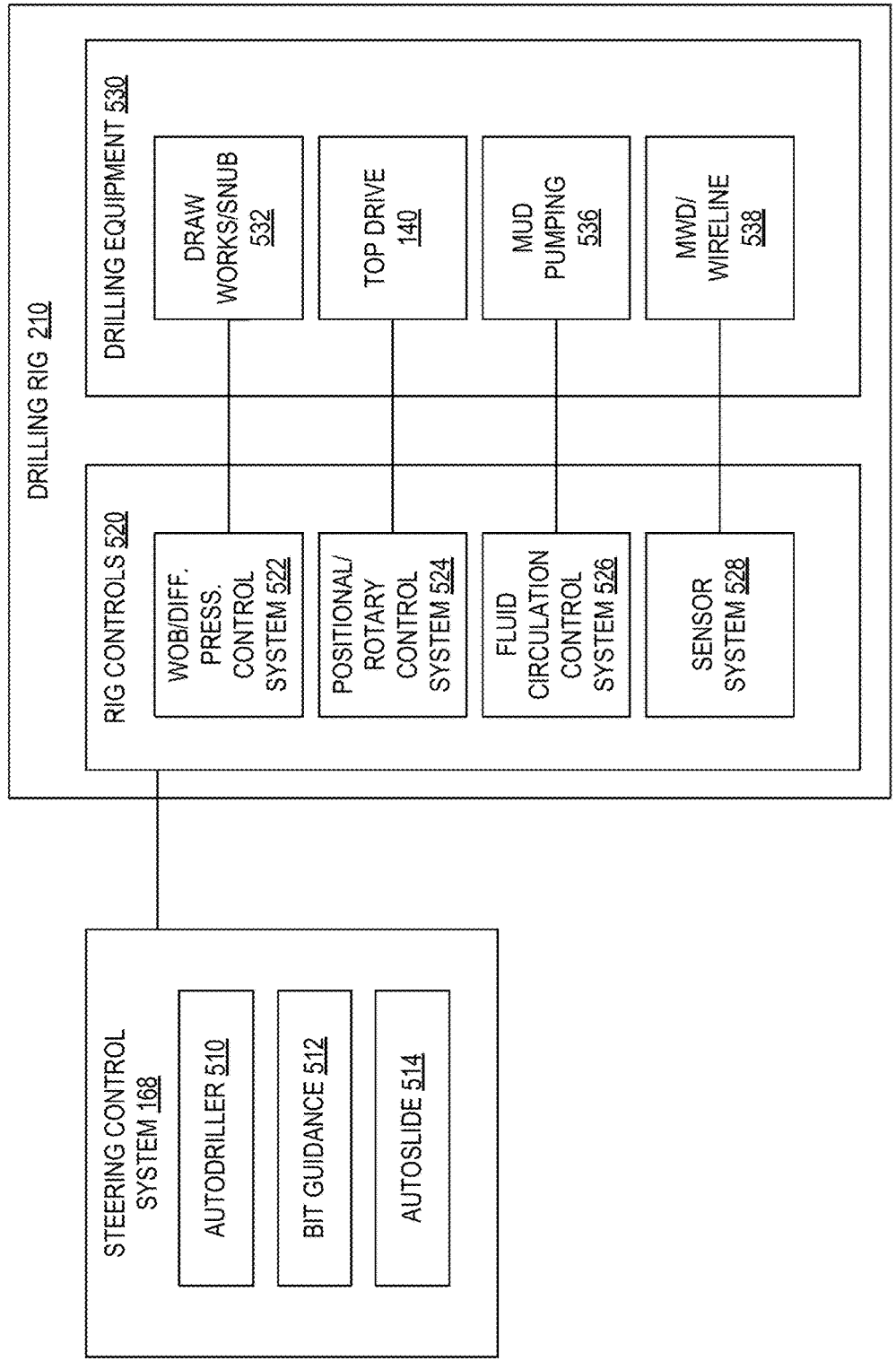
FIG. 5 is a depiction of rig control systems included in the drilling system.

Referring now to FIG. 5, an example of rig control systems 500 is illustrated in schematic form. It is noted that rig control systems 500 may include fewer or more elements than shown in FIG. 5 in different embodiments. As shown, rig control systems 500 includes steering control system 168 and drilling rig 210. Specifically, steering control system 168 is shown with logical functionality including an autodriller 510, a bit guidance 512, and an autoslide 514. Drilling rig 210 is hierarchically shown including rig controls 520, which provide secure control logic and processing capability, along with drilling equipment 530, which represents the physical equipment used for drilling at drilling rig 210. As shown, rig controls 520 include WOB/differential pressure control system 522, positional/rotary control system 524, fluid circulation control system 526, and sensor system 528, while drilling equipment 530 includes a draw works/snub 532, top drive 140, a mud pumping 536, and an MWD/wireline 538.

Figure 10:
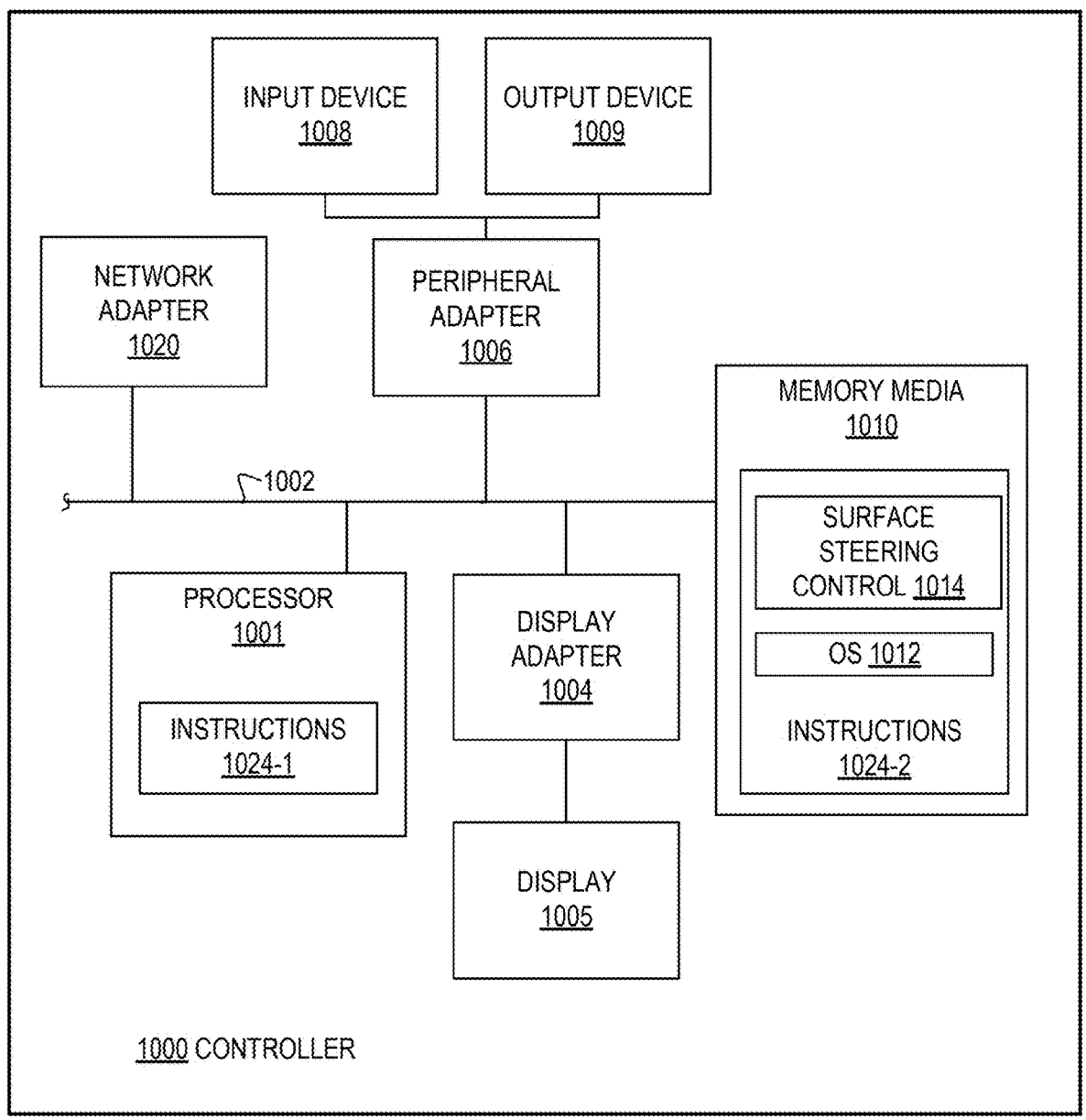
FIG. 10 is a depiction of a controller usable by the rig control systems.

Steering control system 168 represent an instance of a processor having an accessible memory storing instructions executable by the processor, such as an instance of controller 1000 shown in FIG. 10. Also, WOB/differential pressure control system 522, positional/rotary control system 524, and fluid circulation control system 526 may each represent an instance of a processor having an accessible memory storing instructions executable by the processor, such as an instance of controller 1000 shown in FIG. 10, but for example, in a configuration as a programmable logic controller (PLC) that may not include a user interface but may be used as an embedded controller. Accordingly, it is noted that each of the systems included in rig controls 520 may be a separate controller, such as a PLC, and may autonomously operate, at least to a degree. Steering control system 168 may represent hardware that executes instructions to implement a surface steerable system that provides feedback and automation capability to an operator, such as a driller. For example, steering control system 168 may cause autodriller 510, bit guidance 512 (also referred to as a bit guidance system (BGS)), and autoslide 514 (among others, not shown) to be activated and executed at an appropriate time during drilling. In particular implementations, steering control system 168 may be enabled to provide a user interface during drilling, such as the user interface 850 depicted and described below with respect to FIG. 8. Accordingly, steering control system 168 may interface with rig controls 520 to facilitate manual, assisted manual, semi-automatic, and automatic operation of drilling equipment 530 included in drilling rig 210. It is noted that rig controls 520 may also accordingly be enabled for manual or user-controlled operation of drilling, and may include certain levels of automation with respect to drilling equipment 530.

In rig control systems 500 of FIG. 5, WOB/differential pressure control system 522 may be interfaced with draw works/snubbing unit 532 to control WOB of drill string 146. Positional/rotary control system 524 may be interfaced with top drive 140 to control rotation of drill string 146. Fluid circulation control system 526 may be interfaced with mud pumping 536 to control mud flow and may also receive and decode mud telemetry signals. Sensor system 528 may be interfaced with MWD/wireline 538, which may represent various BHA sensors and instrumentation equipment, among other sensors that may be downhole or at the surface.

In rig control systems 500, autodriller 510 may represent an automated rotary drilling system and may be used for controlling rotary drilling. Accordingly, autodriller 510 may enable automate operation of rig controls 520 during rotary drilling, as indicated in the well plan. Bit guidance 512 may represent an automated control system to monitor and control performance and operation drilling bit 148.

In rig control systems 500, autoslide 514 may represent an automated slide drilling system and may be used for controlling slide drilling. Accordingly, autoslide 514 may enable automate operation of rig controls 520 during a slide, and may return control to steering control system 168 for rotary drilling at an appropriate time, as indicated in the well plan. In particular implementations, autoslide 514 may be enabled to provide a user interface during slide drilling to specifically monitor and control the slide. For example, autoslide 514 may rely on bit guidance 512 for orienting a tool face and on autodriller 510 to set WOB or control rotation or vibration of drill string 146.

Figure 6:
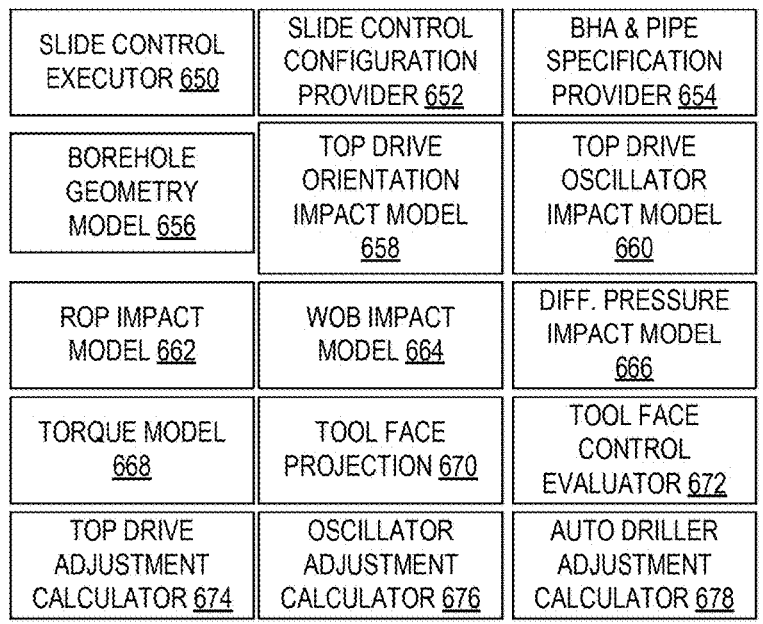
FIG. 6 is a depiction of algorithm modules used by the rig control systems.

FIG. 6 illustrates one embodiment of control algorithm modules 600 used with steering control system 168. The control algorithm modules 600 of FIG. 6 include: a slide control executor 650 that is responsible for managing the execution of the slide control algorithms; a slide control configuration provider 652 that is responsible for validating, maintaining, and providing configuration parameters for the other software modules; a BHA & pipe specification provider 654 that is responsible for managing and providing details of BHA 149 and drill string 146 characteristics; a borehole geometry model 656 that is responsible for keeping track of the borehole geometry and providing a representation to other software modules; a top drive orientation impact model 658 that is responsible for modeling the impact that changes to the angular orientation of top drive 140 have had on the tool face control; a top drive oscillator impact model 660 that is responsible for modeling the impact that oscillations of top drive 140 has had on the tool face control; an ROP impact model 662 that is responsible for modeling the effect on the tool face control of a change in ROP or a corresponding ROP set point; a WOB impact model 664 that is responsible for modeling the effect on the tool face control of a change in WOB or a corresponding WOB set point; a differential pressure impact model 666 that is responsible for modeling the effect on the tool face control of a change in differential pressure (DP) or a corresponding DP set point; a torque model 668 that is responsible for modeling the comprehensive representation of torque for surface, downhole, break over, and reactive torque, modeling impact of those torque values on tool face control, and determining torque operational thresholds; a tool face control evaluator 672 that is responsible for evaluating all factors impacting tool face control and whether adjustments need to be projected, determining whether re-alignment off-bottom is indicated, and determining off-bottom tool face operational threshold windows; a tool face projection 670 that is responsible for projecting tool face behavior for top drive 140, the top drive oscillator, and auto driller adjustments; a top drive adjustment calculator 674 that is responsible for calculating top drive adjustments resultant to tool face projections; an oscillator adjustment calculator 676 that is responsible for calculating oscillator adjustments resultant to tool face projections; and an autodriller adjustment calculator 678 that is responsible for calculating adjustments to autodriller 510 resultant to tool face projections.

Figure 7:
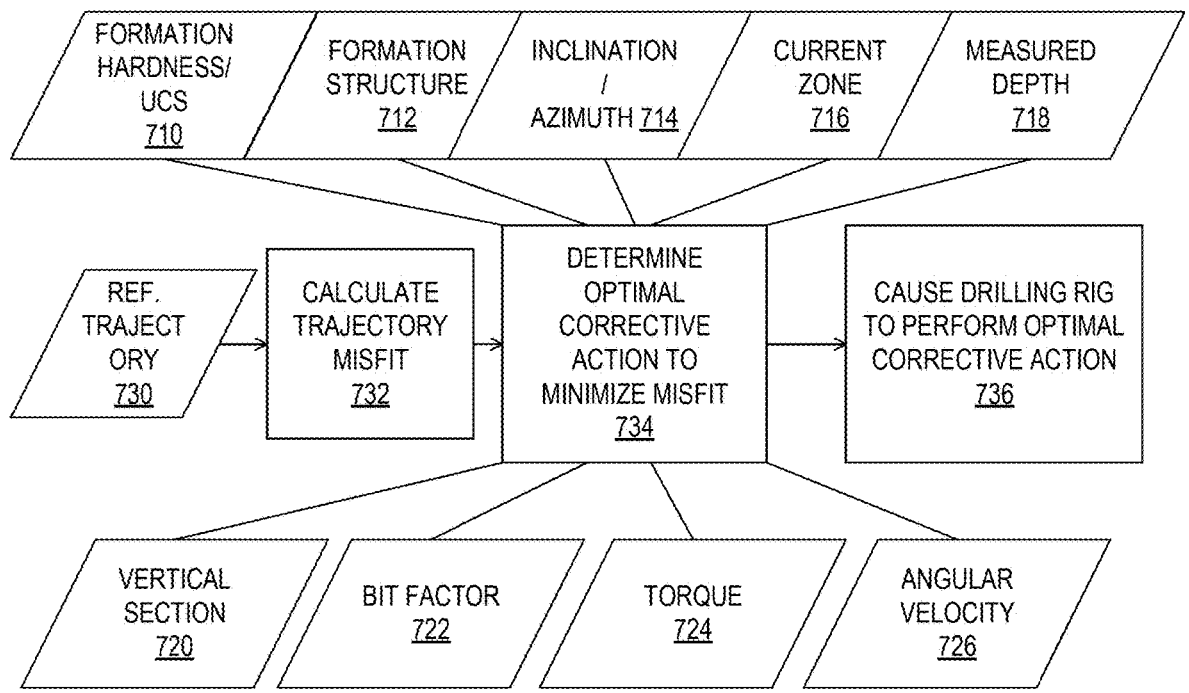
FIG. 7 is a depiction of a steering control process used by the rig control systems.

FIG. 7 illustrates one embodiment of a steering control process 700 for determining a corrective action for drilling. Steering control process 700 may be used for rotary drilling or slide drilling in different embodiments.

Steering control process 700 in FIG. 7 illustrates a variety of inputs that can be used to determine an optimum corrective action. As shown in FIG. 7, the inputs include formation hardness/unconfined compressive strength (UCS) 710, formation structure 712, inclination/azimuth 714, current zone 716, measured depth 718, desired tool face 730, vertical section 720, bit factor 722, mud motor torque 724, reference trajectory 730, vertical section 720, bit factor 722, torque 724 and angular velocity 726. In FIG. 7, reference trajectory 730 of borehole 106 is determined to calculate a trajectory misfit in a step 732. Step 732 may output the trajectory misfit to determine a corrective action to minimize the misfit at step 734, which may be performed using the other inputs described above. Then, at step 736, the drilling rig is caused to perform the corrective action.

It is noted that in some implementations, at least certain portions of steering control process 700 may be automated or performed without user intervention, such as using rig control systems 700 (see FIG. 7). In other implementations, the corrective action in step 736 may be provided or communicated (by display, SMS message, email, or otherwise) to one or more human operators, who may then take appropriate action. The human operators may be members of a rig crew, which may be located at or near drilling rig 210, or may be located remotely from drilling rig 210.

Figure 8:
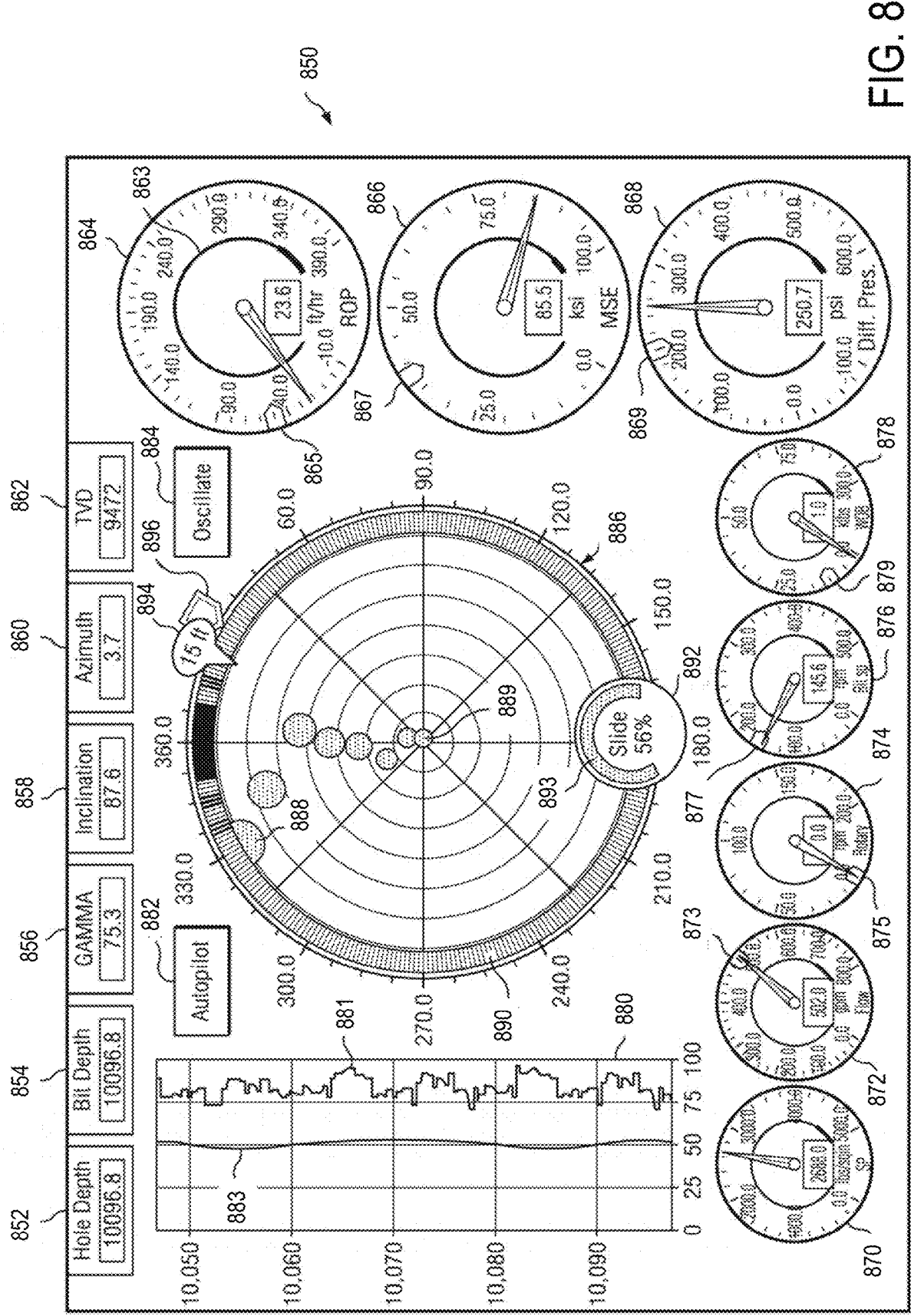
FIG. 8 is a depiction of a graphical user interface provided by the rig control systems.

Referring to FIG. 8, one embodiment of a user interface 850 that may be generated by steering control system 168 for monitoring and operation by a human operator is illustrated. User interface 850 may provide many different types of information in an easily accessible format. For example, user interface 850 may be shown on a computer monitor, a television, a viewing screen (e.g., a display device) associated with steering control system 168.

As shown in FIG. 8, user interface 850 provides visual indicators such as a hole depth indicator 852, a bit depth indicator 854, a GAMMA indicator 856, an inclination indicator 858, an azimuth indicator 860, and a TVD indicator 862. Other indicators may also be provided, including a ROP indicator 864, a mechanical specific energy (MSE) indicator 866, a differential pressure indicator 868, a standpipe pressure indicator 870, a flow rate indicator 872, a rotary RPM (angular velocity) indicator 874, a bit speed indicator 876, and a WOB indicator 878.

In FIG. 8, at least some of indicators 864, 866, 868, 870, 872, 874, 876, and 878 may include a marker representing a target value. For example, markers may be set as certain given values, but it is noted that any desired target value may be used. Although not shown, in some embodiments, multiple markers may be present on a single indicator. The markers may vary in color or size. For example, ROP indicator 864 may include a marker 865 indicating that the target value is 50 feet/hour (or 15 m/h). MSE indicator 866 may include a marker 867 indicating that the target value is 37 ksi (or 255 MPa). Differential pressure indicator 868 may include a marker 869 indicating that the target value is 200 psi (or 1.38 kPa). ROP indicator 864 may include a marker 865 indicating that the target value is 50 feet/hour (or 15 m/h). Standpipe pressure indicator 870 may have no marker in the present example. Flow rate indicator 872 may include a marker 873 indicating that the target value is 500 gpm (or 31.5 L/s). Rotary RPM indicator 874 may include a marker 875 indicating that the target value is 0 RPM (e.g., due to sliding). Bit speed indicator 876 may include a marker 877 indicating that the target value is 150 RPM. WOB indicator 878 may include a marker 879 indicating that the target value is 10 klbs (or 4,500 kg). Each indicator may also include a colored band, or another marking, to indicate, for example, whether the respective gauge value is within a safe range (e.g., indicated by a green color), within a caution range (e.g., indicated by a yellow color), or within a danger range (e.g., indicated by a red color).

In FIG. 8, a log chart 880 may visually indicate depth versus one or more measurements (e.g., may represent log inputs relative to a progressing depth chart). For example, log chart 880 may have a Y-axis representing depth and an X-axis representing a measurement such as GAMMA count 881 (as shown), ROP 883 (e.g., empirical ROP and normalized ROP), or resistivity. An autopilot button 882 and an oscillate button 884 may be used to control activity. For example, autopilot button 882 may be used to engage or disengage autodriller 510, while oscillate button 884 may be used to directly control oscillation of drill string 146 or to engage/disengage an external hardware device or controller.

In FIG. 8, a circular chart 886 may provide current and historical tool face orientation information (e.g., which way the bend is pointed). For purposes of illustration, circular chart 886 represents three hundred and sixty degrees. A series of circles within circular chart 886 may represent a timeline of tool face orientations, with the sizes of the circles indicating the temporal position of each circle. For example, larger circles may be more recent than smaller circles, so a largest circle 888 may be the newest reading and a smallest circle 889 may be the oldest reading. In other embodiments, circles 889, 888 may represent the energy or progress made via size, color, shape, a number within a circle, etc. For example, a size of a particular circle may represent an accumulation of orientation and progress for the period of time represented by the circle. In other embodiments, concentric circles representing time (e.g., with the outside of circular chart 886 being the most recent time and the center point being the oldest time) may be used to indicate the energy or progress (e.g., via color or patterning such as dashes or dots rather than a solid line).

In user interface 850, circular chart 886 may also be color coded, with the color coding existing in a band 890 around circular chart 886 or positioned or represented in other ways. The color coding may use colors to indicate activity in a certain direction. For example, the color red may indicate the highest level of activity, while the color blue may indicate the lowest level of activity. Furthermore, the arc range in degrees of a color may indicate the amount of deviation. Accordingly, a relatively narrow (e.g., thirty degrees) arc of red with a relatively broad (e.g., three hundred degrees) arc of blue may indicate that most activity is occurring in a particular tool face orientation with little deviation. As shown in user interface 850, the color blue may extend from approximately 22-337 degrees, the color green may extend from approximately 15-22 degrees and 337-345 degrees, the color yellow may extend a few degrees around the 13 and 345 degree marks, while the color red may extend from approximately 347-10 degrees. Transition colors or shades may be used with, for example, the color orange marking the transition between red and yellow or a light blue marking the transition between blue and green. This color coding may enable user interface 850 to provide an intuitive summary of how narrow the standard deviation is and how much of the energy intensity is being expended in the proper direction. Furthermore, the center of energy may be viewed relative to the target. For example, user interface 850 may clearly show that the target is at 90 degrees but the center of energy is at 45 degrees.

In user interface 850, other indicators, such as a slide indicator 892, may indicate how much time remains until a slide occurs or how much time remains for a current slide. For example, slide indicator 892 may represent a time, a percentage (e.g., as shown, a current slide may be 56% complete), a distance completed, or a distance remaining. Slide indicator 892 may graphically display information using, for example, a colored bar 893 that increases or decreases with slide progress. In some embodiments, slide indicator 892 may be built into circular chart 886 (e.g., around the outer edge with an increasing/decreasing band), while in other embodiments slide indicator 892 may be a separate indicator such as a meter, a bar, a gauge, or another indicator type. In various implementations, slide indicator 892 may be refreshed by autoslide 514.

In user interface 850, an error indicator 894 may indicate a magnitude and a direction of error. For example, error indicator 894 may indicate that an estimated drill bit position is a certain distance from the planned trajectory, with a location of error indicator 894 around the circular chart 886 representing the heading. For example, FIG. 8 illustrates an error magnitude of 15 feet and an error direction of 15 degrees. Error indicator 894 may be any color but may be red for purposes of example. It is noted that error indicator 894 may present a zero if there is no error. Error indicator may represent that drill bit 148 is on the planned trajectory using other means, such as being a green color. Transition colors, such as yellow, may be used to indicate varying amounts of error. In some embodiments, error indicator 894 may not appear unless there is an error in magnitude or direction. A marker 896 may indicate an ideal slide direction. Although not shown, other indicators may be present, such as a bit life indicator to indicate an estimated lifetime for the current bit based on a value such as time or distance.

It is noted that user interface 850 may be arranged in many different ways. For example, colors may be used to indicate normal operation, warnings, and problems. In such cases, the numerical indicators may display numbers in one color (e.g., green) for normal operation, may use another color (e.g., yellow) for warnings, and may use yet another color (e.g., red) when a serious problem occurs. The indicators may also flash or otherwise indicate an alert. The gauge indicators may include colors (e.g., green, yellow, and red) to indicate operational conditions and may also indicate the target value (e.g., an ROP of 100 feet/hour). For example, ROP indicator 868 may have a green bar to indicate a normal level of operation (e.g., from 10-300 feet/hour), a yellow bar to indicate a warning level of operation (e.g., from 300-360 feet/hour), and a red bar to indicate a dangerous or otherwise out of parameter level of operation (e.g., from 360-390 feet/hour). ROP indicator 868 may also display a marker at 100 feet/hour to indicate the desired target ROP.

Furthermore, the use of numeric indicators, gauges, and similar visual display indicators may be varied based on factors such as the information to be conveyed and the personal preference of the viewer. Accordingly, user interface 850 may provide a customizable view of various drilling processes and information for a particular individual involved in the drilling process. For example, steering control system 168 may enable a user to customize the user interface 850 as desired, although certain features (e.g., standpipe pressure) may be locked to prevent a user from intentionally or accidentally removing important drilling information from user interface 850. Other features and attributes of user interface 850 may be set by user preference. Accordingly, the level of customization and the information shown by the user interface 850 may be controlled based on who is viewing user interface 850 and their role in the drilling process.

Figure 9:
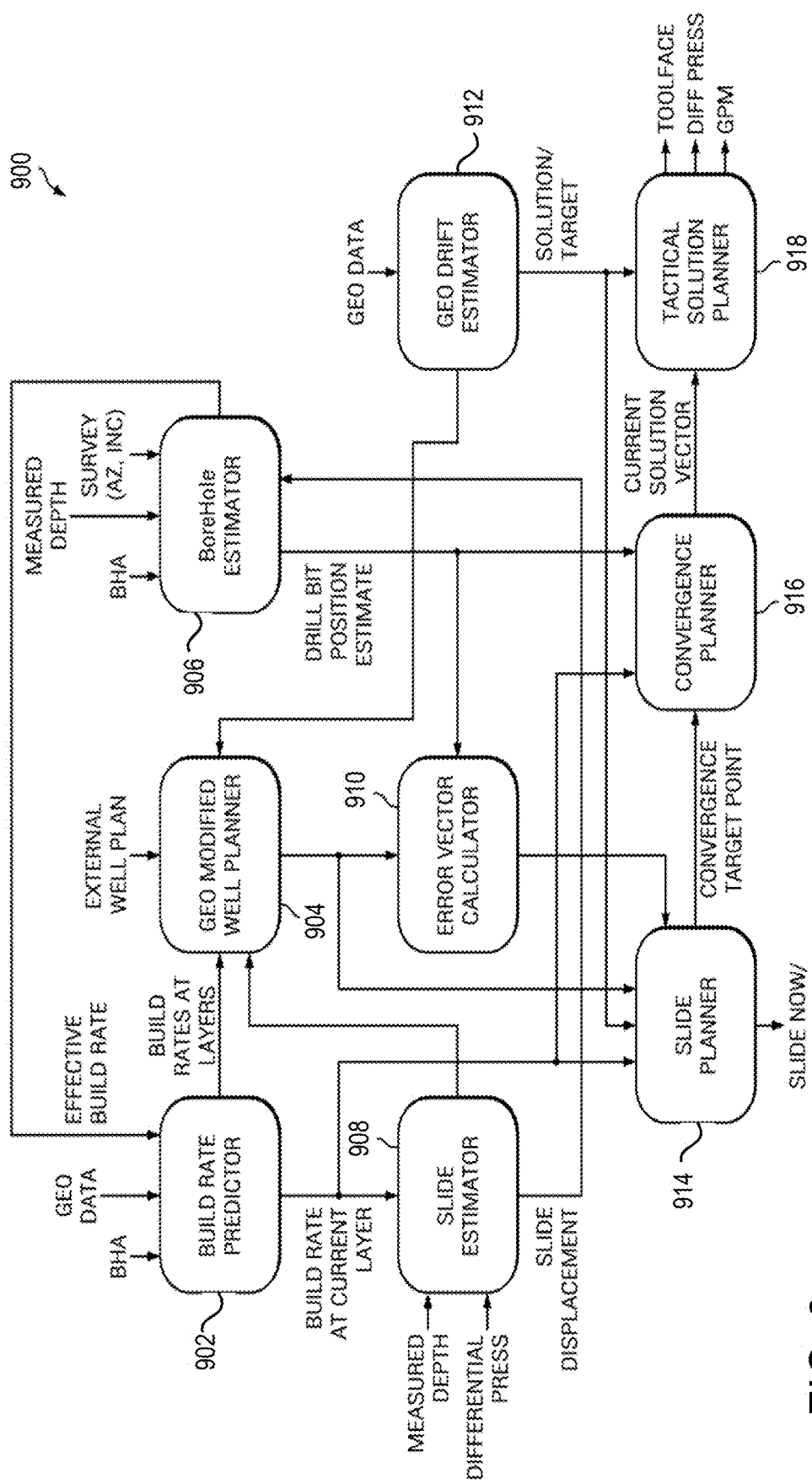
FIG. 9 is a depiction of a guidance control loop performed by the rig control systems.

Referring to FIG. 9, one embodiment of a guidance control loop (GCL) 900 is shown in further detail GCL 900 may represent one example of a control loop or control algorithm executed under the control of steering control system 168. GCL 900 may include various functional modules, including a build rate predictor 902, a geo modified well planner 904, a borehole estimator 906, a slide estimator 908, an error vector calculator 910, a geological drift estimator 912, a slide planner 914, a convergence planner 916, and a tactical solution planner 918. In the following description of GCL 900, the term "external input" refers to input received from outside GCL 900, while "internal input" refers to input exchanged between functional modules of GCL 900.

In FIG. 9, build rate predictor 902 receives external input representing BHA information and geological information, receives internal input from the borehole estimator 906, and provides output to geo modified well planner 904, slide estimator 908, slide planner 914, and convergence planner 916. Build rate predictor 902 is configured to use the BHA information and geological information to predict drilling build rates of current and future sections of borehole 106. For example, build rate predictor 902 may determine how aggressively a curve will be built for a given formation with BHA 149 and other equipment parameters.

In FIG. 9, build rate predictor 902 may use the orientation of BHA 149 to the formation to determine an angle of attack for formation transitions and build rates within a single layer of a formation. For example, if a strata layer of rock is below a strata layer of sand, a formation transition exists between the strata layer of sand and the strata layer of rock. Approaching the strata layer of rock at a 90 degree angle may provide a good tool face and a clean drill entry, while approaching the rock layer at a 45 degree angle may build a curve relatively quickly. An angle of approach that is near parallel may cause drill bit 148 to skip off the upper surface of the strata layer of rock. Accordingly, build rate predictor 902 may calculate BHA orientation to account for formation transitions. Within a single strata layer, build rate predictor 902 may use the BHA orientation to account for internal layer characteristics (e.g., grain) to determine build rates for different parts of a strata layer. The BHA information may include bit characteristics, mud motor bend setting, stabilization and mud motor bit to bend distance. The geological information may include formation data such as compressive strength, thicknesses, and depths for formations encountered in the specific drilling location. Such information may enable a calculation-based prediction of the build rates and ROP that may be compared to both results obtained while drilling borehole 106 and regional historical results (e.g., from the regional drilling DB 412) to improve the accuracy of predictions as drilling progresses. Build rate predictor 902 may also be used to plan convergence adjustments and confirm in advance of drilling that targets can be achieved with current parameters.

In FIG. 9, geo modified well planner 904 receives external input representing a well plan, internal input from build rate predictor 902 and geo drift estimator 912, and provides output to slide planner 914 and error vector calculator 910. Geo modified well planner 904 uses the input to determine whether there is a more desirable trajectory than that provided by the well plan, while staying within specified error limits. More specifically, geo modified well planner 904 takes geological information (e.g., drift) and calculates whether another trajectory solution to the target may be more efficient in terms of cost or reliability. The outputs of geo modified well planner 904 to slide planner 914 and error vector calculator 910 may be used to calculate an error vector based on the current vector to the newly calculated trajectory and to modify slide predictions. In some embodiments, geo modified well planner 904 (or another module) may provide functionality needed to track a formation trend. For example, in horizontal wells, a geologist may provide steering control system 168 with a target inclination angle as a set point for steering control system 168 to control. For example, the geologist may enter a target to steering control system 168 of 90.5-91.0 degrees of inclination angle for a section of borehole 106. Geo modified well planner 904 may then treat the target as a vector target, while remaining within the error limits of the original well plan. In some embodiments, geo modified well planner 904 may be an optional module that is not used unless the well plan is to be modified. For example, if the well plan is marked in steering control system 168 as non-modifiable, geo modified well planner 904 may be bypassed altogether or geo modified well planner 904 may be configured to pass the well plan through without any changes.

In FIG. 9, borehole estimator 906 may receive external inputs representing BHA information, measured depth information, survey information (e.g., azimuth angle and inclination angle), and may provide outputs to build rate predictor 902, error vector calculator 910, and convergence planner 916. Borehole estimator 906 may be configured to provide an estimate of the actual borehole and drill bit position and trajectory angle without delay, based on either straight line projections or projections that incorporate sliding. Borehole estimator 906 may be used to compensate for a sensor being physically located some distance behind drill bit 148 (e.g., 50 feet) in drill string 146, which makes sensor readings lag the actual bit location by 50 feet. Borehole estimator 906 may also be used to compensate for sensor measurements that may not be continuous (e.g., a sensor measurement may occur every 100 feet). Borehole estimator 906 may provide the most accurate estimate from the surface to the last survey location based on the collection of survey measurements. Also, borehole estimator 906 may take the slide estimate from slide estimator 908 (described below) and extend the slide estimate from the last survey point to a current location of drill bit 148. Using the combination of these two estimates, borehole estimator 906 may provide steering control system 168 with an estimate of the drill bit's location and trajectory angle from which guidance and steering solutions can be derived. An additional metric that can be derived from the borehole estimate is the effective build rate that is achieved throughout the drilling process.

In FIG. 9, slide estimator 908 receives external inputs representing measured depth and differential pressure information, receives internal input from build rate predictor 902, and provides output to borehole estimator 906 and geo modified well planner 904. Slide estimator 908 may be configured to sample tool face orientation, differential pressure, measured depth (MD) incremental movement, MSE, and other sensor feedback to quantify/estimate a deviation vector and progress while sliding.

Traditionally, deviation from the slide would be predicted by a human operator based on experience. The operator would, for example, use a long slide cycle to assess what likely was accomplished during the last slide. However, the results are generally not confirmed until the downhole survey sensor point passes the slide portion of the borehole, often resulting in a response lag defined by a distance of the sensor point from the drill bit tip (e.g., approximately 50 feet). Such a response lag may introduce inefficiencies in the slide cycles due to over/under correction of the actual trajectory relative to the planned trajectory.

In GCL 900, using slide estimator 908, each tool face update may be algorithmically merged with the average differential pressure of the period between the previous and current tool face readings, as well as the MD change during this period to predict the direction, angular deviation, and MD progress during the period. As an example, the periodic rate may be between 10 and 60 seconds per cycle depending on the tool face update rate of downhole tool 166. With a more accurate estimation of the slide effectiveness, the sliding efficiency can be improved. The output of slide estimator 908 may accordingly be periodically provided to borehole estimator 906 for accumulation of well deviation information, as well to geo modified well planner 904. Some or all of the output of the slide estimator 908 may be output to an operator, such as shown in the user interface 850 of FIG. 8.

In FIG. 9, error vector calculator 910 may receive internal input from geo modified well planner 904 and borehole estimator 906. Error vector calculator 910 may be configured to compare the planned well trajectory to an actual borehole trajectory and drill bit position estimate. Error vector calculator 910 may provide the metrics used to determine the error (e.g., how far off) the current drill bit position and trajectory are from the well plan. For example, error vector calculator 910 may calculate the error between the current bit position and trajectory to the planned trajectory and the desired bit position. Error vector calculator 910 may also calculate a projected bit position/projected trajectory representing the future result of a current error.

In FIG. 9, geological drift estimator 912 receives external input representing geological information and provides outputs to geo modified well planner 904, slide planner 914, and tactical solution planner 918. During drilling, drift may occur as the particular characteristics of the formation affect the drilling direction. More specifically, there may be a trajectory bias that is contributed by the formation as a function of ROP and BHA 149. Geological drift estimator 912 is configured to provide a drift estimate as a vector that can then be used to calculate drift compensation parameters that can be used to offset the drift in a control solution.

In FIG. 9, slide planner 914 receives internal input from build rate predictor 902, geo modified well planner 904, error vector calculator 910, and geological drift estimator 912, and provides output to convergence planner 916 as well as an estimated time to the next slide. Slide planner 914 may be configured to evaluate a slide/drill ahead cost calculation and plan for sliding activity, which may include factoring in BHA wear, expected build rates of current and expected formations, and the well plan trajectory. During drill ahead, slide planner 914 may attempt to forecast an estimated time of the next slide to aid with planning. For example, if additional lubricants (e.g., fluorinated beads) are indicated for the next slide, and pumping the lubricants into drill string 146 has a lead time of 30 minutes before the slide, the estimated time of the next slide may be calculated and then used to schedule when to start pumping the lubricants. Functionality for a loss circulation material (LCM) planner may be provided as part of slide planner 914 or elsewhere (e.g., as a stand-alone module or as part of another module described herein). The LCM planner functionality may be configured to determine whether additives should be pumped into the borehole based on indications such as flow-in versus flow-back measurements. For example, if drilling through a porous rock formation, fluid being pumped into the borehole may get lost in the rock formation. To address this issue, the LCM planner may control pumping LCM into the borehole to clog up the holes in the porous rock surrounding the borehole to establish a more closed-loop control system for the fluid.

In FIG. 9, slide planner 914 may also look at the current position relative to the next connection. A connection may happen every 90 to 100 feet (or some other distance or distance range based on the particulars of the drilling operation) and slide planner 914 may avoid planning a slide when close to a connection or when the slide would carry through the connection. For example, if the slide planner 914 is planning a 50 foot slide but only 20 feet remain until the next connection, slide planner 914 may calculate the slide starting after the next connection and make any changes to the slide parameters to accommodate waiting to slide until after the next connection. Such flexible implementation avoids inefficiencies that may be caused by starting the slide, stopping for the connection, and then having to reorient the tool face before finishing the slide. During slides, slide planner 914 may provide some feedback as to the progress of achieving the desired goal of the current slide. In some embodiments, slide planner 914 may account for reactive torque in drill string 146. More specifically, when rotating is occurring, there is a reactional torque wind up in drill string 146. When the rotating is stopped, drill string 146 unwinds, which changes tool face orientation and other parameters. When rotating is started again, drill string 146 starts to wind back up. Slide planner 914 may account for the reactional torque so that tool face references are maintained, rather than stopping rotation and then trying to adjust to a desired tool face orientation. While not all downhole tools may provide tool face orientation when rotating, using one that does supply such information for GCL 900 may significantly reduce the transition time from rotating to sliding.

In FIG. 9, convergence planner 916 receives internal inputs from build rate predictor 902, borehole estimator 906, and slide planner 914, and provides output to tactical solution planner 918. Convergence planner 916 is configured to provide a convergence plan when the current drill bit position is not within a defined margin of error of the planned well trajectory. The convergence plan represents a path from the current drill bit position to an achievable and desired convergence target point along the planned trajectory. The convergence plan may take account the amount of sliding/drilling ahead that has been planned to take place by slide planner 914. Convergence planner 916 may also use BHA orientation information for angle of attack calculations when determining convergence plans as described above with respect to build rate predictor 902. The solution provided by convergence planner 916 defines a new trajectory solution for the current position of drill bit 148. The solution may be immediate without delay, or planned for implementation at a future time that is specified in advance.

In FIG. 9, tactical solution planner 918 receives internal inputs from geological drift estimator 912 and convergence planner 916, and provides external outputs representing information such as tool face orientation, differential pressure, and mud flow rate. Tactical solution planner 918 is configured to take the trajectory solution provided by convergence planner 916 and translate the solution into control parameters that can be used to control drilling rig 210. For example, tactical solution planner 918 may convert the solution into settings for control systems 522, 524, and 526 to accomplish the actual drilling based on the solution. Tactical solution planner 918 may also perform performance optimization to optimizing the overall drilling operation as well as optimizing the drilling itself (e.g., how to drill faster).

Other functionality may be provided by GCL 900 in additional modules or added to an existing module. For example, there is a relationship between the rotational position of the drill pipe on the surface and the orientation of the downhole tool face. Accordingly, GCL 900 may receive information corresponding to the rotational position of the drill pipe on the surface. GCL 900 may use this surface positional information to calculate current and desired tool face orientations. These calculations may then be used to define control parameters for adjusting the top drive 140 to accomplish adjustments to the downhole tool face in order to steer the trajectory of borehole 106.

For purposes of example, an object-oriented software approach may be utilized to provide a class-based structure that may be used with GCL 900 or other functionality provided by steering control system 168. In GCL 900, a drilling model class may be defined to capture and define the drilling state throughout the drilling process. The drilling model class may include information obtained without delay. The drilling model class may be based on the following components and sub-models: a drill bit model, a borehole model, a rig surface gear model, a mud pump model, a WOB/differential pressure model, a positional/rotary model, an MSE model, an active well plan, and control limits. The drilling model class may produce a control output solution and may be executed via a main processing loop that rotates through the various modules of GCL 900. The drill bit model may represent the current position and state of drill bit 148. The drill bit model may include a three dimensional (3D) position, a drill bit trajectory, BHA information, bit speed, and tool face (e.g., orientation information). The 3D position may be specified in north-south (NS), east-west (EW), and true vertical depth (TVD). The drill bit trajectory may be specified as an inclination angle and an azimuth angle. The BHA information may be a set of dimensions defining the active BHA. The borehole model may represent the current path and size of the active borehole. The borehole model may include hole depth information, an array of survey points collected along the borehole path, a gamma log, and borehole diameters. The hole depth information is for current drilling of borehole 106. The borehole diameters may represent the diameters of borehole 106 as drilled over current drilling. The rig surface gear model may represent pipe length, block height, and other models, such as the mud pump model, WOB/differential pressure model, positional/rotary model, and MSE model. The mud pump model represents mud pump equipment and includes flow rate, standpipe pressure, and differential pressure. The WOB/differential pressure model represents draw works or other WOB/differential pressure controls and parameters, including WOB. The positional/rotary model represents top drive or other positional/rotary controls and parameters including rotary RPM and spindle position. The active well plan represents the target borehole path and may include an external well plan and a modified well plan. The control limits represent defined parameters that may be set as maximums and/or minimums. For example, control limits may be set for the rotary RPM in the top drive model to limit the maximum RPMs to the defined level. The control output solution may represent the control parameters for drilling rig 210.

Each functional module of GCL 900 may have behavior encapsulated within a respective class definition. During a processing window, the individual functional modules may have an exclusive portion in time to execute and update the drilling model. For purposes of example, the processing order for the functional modules may be in the sequence of geo modified well planner 904, build rate predictor 902, slide estimator 908, borehole estimator 906, error vector calculator 910, slide planner 914, convergence planner 916, geological drift estimator 912, and tactical solution planner 918. It is noted that other sequences may be used in different implementations.

In FIG. 9, GCL 900 may rely on a programmable timer module that provides a timing mechanism to provide timer event signals to drive the main processing loop. While steering control system 168 may rely on timer and date calls driven by the programming environment, timing may be obtained from other sources than system time. In situations where it may be advantageous to manipulate the clock (e.g., for evaluation and testing), a programmable timer module may be used to alter the system time. For example, the programmable timer module may enable a default time set to the system time and a time scale of 1.0, may enable the system time of steering control system 168 to be manually set, may enable the time scale relative to the system time to be modified, or may enable periodic event time requests scaled to a requested time scale.

Referring now to FIG. 10, a block diagram illustrating selected elements of an embodiment of a controller 1000 for performing surface steering according to the present disclosure. In various embodiments, controller 1000 may represent an implementation of steering control system 168. In other embodiments, at least certain portions of controller 1000 may be used for control systems 510, 512, 514, 522, 524, and 526 (see FIG. 5).

In the embodiment depicted in FIG. 10, controller 1000 includes processor 1001 coupled via shared bus 1002 to storage media collectively identified as memory media 1010.

Controller 1000, as depicted in FIG. 10, further includes network adapter 1020 that interfaces controller 1000 to a network (not shown in FIG. 10). In embodiments suitable for use with user interfaces, controller 1000, as depicted in FIG. 10, may include peripheral adapter 1006, which provides connectivity for the use of input device 1008 and output device 1009. Input device 1008 may represent a device for user input, such as a keyboard or a mouse, or even a video camera. Output device 1009 may represent a device for providing signals or indications to a user, such as loudspeakers for generating audio signals.

Controller 1000 is shown in FIG. 10 including display adapter 1004 and further includes a display device 1005. Display adapter 1004 may interface shared bus 1002, or another bus, with an output port for one or more display devices, such as display device 1005. Display device 1005 may be implemented as a liquid crystal display screen, a computer monitor, a television or the like. Display device 1005 may comply with a display standard for the corresponding type of display. Standards for computer monitors include analog standards such as video graphics array (VGA), extended graphics array (XGA), etc., or digital standards such as digital visual interface (DVI), definition multimedia interface (HDMI), among others. A television display may comply with standards such as NTSC (National Television System Committee), PAL (Phase Alternating Line), or another suitable standard. Display device 1005 may include an output device 1009, such as one or more integrated speakers to play audio content, or may include an input device 1008, such as a microphone or video camera.

In FIG. 10, memory media 1010 encompasses persistent and volatile media, fixed and removable media, and magnetic and semiconductor media. Memory media 1010 is operable to store instructions, data, or both. Memory media 1010 as shown includes sets or sequences of instructions 1024-2, namely, an operating system 1012 and surface steering control 1014. Operating system 1012 may be a UNIX or UNIX-like operating system, a Windows® family operating system, or another suitable operating system. Instructions 1024 may also reside, completely or at least partially, within processor 1001 during execution thereof. It is further noted that processor 1001 may be configured to receive instructions 1024-1 from instructions 1024-2 via shared bus 1002. In some embodiments, memory media 1010 is configured to store and provide executable instructions for executing GCL 900, as mentioned previously, among other methods and operations disclosed herein.

As noted previously, BHA 149 may represent a key component of drilling system 210 and may include heavy weight drill pipe, drill collars, stabilizers, reamers, subs, a down hole motor, and various directional surveying tools, among other components. BHA 149 is typically deployed on a string of steel pipes (drill string 146) that transmits power in the form of mechanical and hydraulic energy from drilling rig 210 at surface 104 to drill bit 148.

Each drill pipe 144 has a "box", or female thread, on one end and a "pin", or male thread, on an opposite end. In use, drill pipes 144 are coupled together by threading the respective box and pin ends with each other under torque to form a joint between drill pipes 144. The finished ends of drill pipe 144 with either the box or the pin may be formed by friction welding, inertia welding, or flash welding, among other methods, which may provide high-strength, high-pressure threadable connections that are sufficiently robust to survive the rigors of drilling and numerous cycles of tightening and loosening the threaded joints. The finished ends of drill pipe 144, with either the box or the pin, typically have a larger diameter than a central tube portion of drill pipe 144 and are typically made of steel that has been heat treated to a higher strength than the steel of the tube portion of drill pipe 144. The large-diameter section of the box and the pin provides a low stress area where pipe tongs are used to grip drill pipe 144. Hence, relatively small cuts caused by the pipe tongs do not significantly impair the strength or life of drill pipe 144.

Two or three (or more) drill pipes 144 can be threaded together to form a "stand". Each stand may be stacked up on fingerboards after tripping out and can be directly picked up during tripping in. The stand arrangement enables more efficient operations than compared to threading and unthreading individual drill pipe joints at the time of drilling. Drill string 146 is supported by top drive 140 on drilling rig 210, which rotates drill string 146 at surface 104 to drive drill bit 148 and to control how drill string 146 advances downhole.

BHA 146 generally represents a small portion of the overall length of drill string 146. The length of BHA 146 can be added to the length of drill string 146 to determine hole depth. Accordingly, the hole depth for operations conducted downhole, such as drilling at a particular depth, may be determined by the length of BHA 149 and the length of drill pipe 144 entering borehole 106.

The following disclosure explains additional and improved methods and systems for drilling. In particular, the following systems and methods can be useful to maintain and increase confidence in drilling pipe tallies and thereby additionally more accurately determine weight on bit (WOB) and borehole depth. The following methods and systems can be used to automatically maintain and verify drilling pipe tallies and identify and account for transient errors in WOB measurements due to joints between pipe segments. It should be noted that the following methods may be implemented by a computer system such as any of those described above. For example, the computer system used to perform the methods described below may be a part of the steering control system 168, a part of the rig controls system 500, a part of the drilling system 100, included with the controller 1000, or may be a similar or different computer system and may be coupled to one or more of the foregoing systems. The computer system may be located at or near the rig site, or may be located at a remote location from the rig site, and may be configured to transmit and receive data to and from a rig site while a well is being drilled.

The determination of hole depth is typically performed using measurements taken by a rig crew member on site with a measuring tape and a tally book. For example, each drill pipe stand may be measured using a measuring tape, such as when laid down on the pipe rack, either before the drill pipe stand is picked for tripping in, or after being pulled out of borehole 106. Each drill pipe stand is typically tracked on a tally book manually immediately before being picked up for insertion into borehole 106. The manual tallying can be an arduous process in a fast-paced dynamic environment that often leads to unwanted gross errors, such as wrong tally, inaccurate measurements, and mis-communication among rig crew members, among other potential errors.

One good practice is to manually record the number of drill pipe stands on the rack before drilling begins, and then record the changes in number of drill pipe stands on the rack during drilling. But with the advent of directional drilling, hole depths can frequently exceed 20,000 feet with a drill string having a total of 500-600 drill pipe stands, making manual tracking a challenging task.

The measurement of hole depth is typically performed with different methods. A directional survey station may include a measurement of inclination angle, azimuth angle, and Measured Depth (MD). While inclination angle and azimuth angle are determined (with a certain acceptable predictability as defined by error models) by measuring a reference field that is local to the survey station location (e.g., magnetic field, gravitational field, and earth's rotational rate) there is a lack of such a reference for depth measurements and estimates. One common practice is to use pre-determined geological logs to estimate the hole depth by analyzing the rock formations, either by using LWD sensors or rock cuttings retrieved on surface through the mud as a benchmark, and such a measured depth is known as "logger's depth", which can be compared with the pipe tally made on the rig, which known as "driller's depth". Another way to measure hole depth is to compare the ROP or d-exponent with other nearby wells. Although such logs can give an estimation of TVD, there is no reference available for MD of borehole 106. Accuracy in MD measurement has become increasingly important with the advent of directional drilling that allows for multi-well pads with long laterals that target the same reservoir with multiple boreholes 106 to maximize production. Although several error models have been developed for the uncertainty in MD due to various systematic and random errors, the problem of reduction in gross errors that lead to larger along-hole depth errors often remains. The MD error models address reference error (e.g., variable pipe stick up above rotary table), scale errors (e.g., calibration of tape used to measure drill pipe), stretch errors (e.g., tension/compression and thermal expansion). However, certain assumptions are made in the MD error models to idealize the drilling system before any of these theoretical corrections are applied in the field, which may be inaccurate assumptions that adversely affect MD accuracy when used in the field.

Another issue that arises due to inaccurate hole depth measurement is the loss of pipe in borehole 106 due to a failure of an intermediate drill string joint during drilling. With the unaccountability of gross errors, the planning for fishing or side tracking may result in the loss of valuable rig time, and also the further loss of expensive tools and resources. Drill pipe failure is usually marked by outside diameter wear, local thinning of drill pipe, fatigue cracks, corrosion pitting on pipe ID, among other indications. Non-destructive testing (NDT) may enable detecting such early signs of drill pipe failure. Typically, an NDT inspection process is performed offline by implementing periodic testing of sample drill pipes at a test location or a workshop. Thus, offline NDT inspection may lead to significant operational down time for drilling system 100, but may also result in additional inventory and transportation costs, which are undesirable.

There are multiple displacement measuring mechanisms that are used in various industries today with high accuracy. However, the environment of drilling system 100 may be unique from other industries because of the dynamic nature of heavy equipment used and the rugged context of drilling operations.

As will be disclosed in further detail herein, depth measurement methods in the field for pipe tally during drilling for hydrocarbon resources are disclosed using a drill pipe tally system that can provide an accurate pipe tally. The drill pipe tally system disclosed herein may include an automated mechanical system that can improve the accuracy of the pipe tally and can reduce the amount of manual effort that leads to human error. The drill pipe tally system disclosed herein is designed to handle a variety of components that are introduced into borehole 106, including drill pipe 144, BHA 149, stabilizers, agitators, and casings, among other elements, that have a wide range of dimensional variability. The drill pipe tally system disclosed herein may calculate the number of drill pipes 144 entering borehole 106 by counting a number of joints between individual drill pipes 144. The counting of the number joints may be based on a difference between a pipe diameter and a joint outer diameter. By continuously measuring the diameter along the entire drill string, the drill pipe tally system disclosed herein may identify the location of the joints between individual drill pipes 144 and may use a number of counted joints for the tally of individual pipes entering (or leaving) borehole 106. The drill pipe tally system disclosed herein may also be used to measure the true length of drill pipe 144 (under tensile forces) entering borehole 106 by correlating a time between 2 joints to a speed of the crown block spool turning. In addition to removing the gross error and systematic errors in pipe tallying, the drill pipe tally system disclosed herein may also remove random errors, such as pipe stick-up (e.g., a reference error). For smaller errors that occur when drill pipe 144 is in borehole 106 (e.g., temperature factors, buoyant forces, etc.), corrections can be applied by using established mathematical models. The drill pipe tally system disclosed herein may provide a mechanical system that can eliminate many assumptions (e.g., zero reference point, variable lengths of drill pipes and components, etc.) that are typically made before using such mathematical models, which may significantly reduce the hole depth error. The drill pipe tally system disclosed herein may also be compatible with existing equipment that is used with drilling system 200, without substantial modifications to any major component or existing drilling process. In addition, the drill pipe tally system disclosed herein may accommodate the robust and rugged environment of drilling rig 210, which can include the exposure to oil, gas, mud or weather, heavy dynamic components, moving crewmembers, inevitable man-handling of instruments, and personnel safety from exposed moving parts. Although the drill pipe tally system disclosed herein is a mechanical system that is subject to regular wear, the mechanical system is designed in a modular manner for economical and fast serviceability.

Furthermore, the modular nature of the drill pipe tally system disclosed herein allows for on-site drill pipe testing. Various sensors can be mounted on the mechanical system to examine drill pipe 144 and validate the integrity of drill pipe 144 during drilling. The additional ability to perform on-site drill pipe testing is an important economic advantage associated with the drill pipe tally system disclosed herein.

The drill pipe tally system disclosed herein provides a method and system for determining an along-hole depth value by automatically counting a number of drill pipes 144 entering borehole 106 and estimating an actual length of each drill pipe 144 for accurate depth measurement. The drill pipe tally system disclosed herein may rely on the fact that each drill pipe 144 has a joint portion on either end having a larger outer diameter than an outer diameter of the central tube section of drill pipe 144. By automatically measuring the diameter along drill string 146 as drill string 146 is tripped in or out of borehole 106, the drill pipe tally system disclosed herein can physically count the number of drill pipe 144 (by tracking each joint portion between drill pipes 144) going in or out of borehole 106. With the number of drill pipes 144 accurately counted, the drill pipe tally system disclosed herein can use a crown block speed from displacement sensors to accurately calculate the along-hole depth value.

In addition to suitability for a rugged environment, the drill pipe tally system disclosed herein may also be enabled to track a radial motion of drill pipe 144 and accommodate for a wide range of dimensions of various drilling components. The drill pipe tally system disclosed herein may accommodate for various dimensional factors and may use proximity sensors for accurate measurement. The drill pipe tally system disclosed herein may provide a contact-type mechanism that uses high accuracy sensors to indirectly measure displacement. The contact-type mechanism enables accurate measurement of drill pipe 144, while enabling the sensitive high-accuracy sensors to be shielded from the heavy mechanical activity that is associated with introducing drill pipe 144 into borehole 106, such as at a rotary table 1113 at rig floor 1111 (see FIG. 11). The arrangement with indirect sensor measurement enables pipe tally system 1150 to operate reliably in the drilling rig environment, while providing an accurate solution for drill pipe tally in practical operation.

Figure 11:
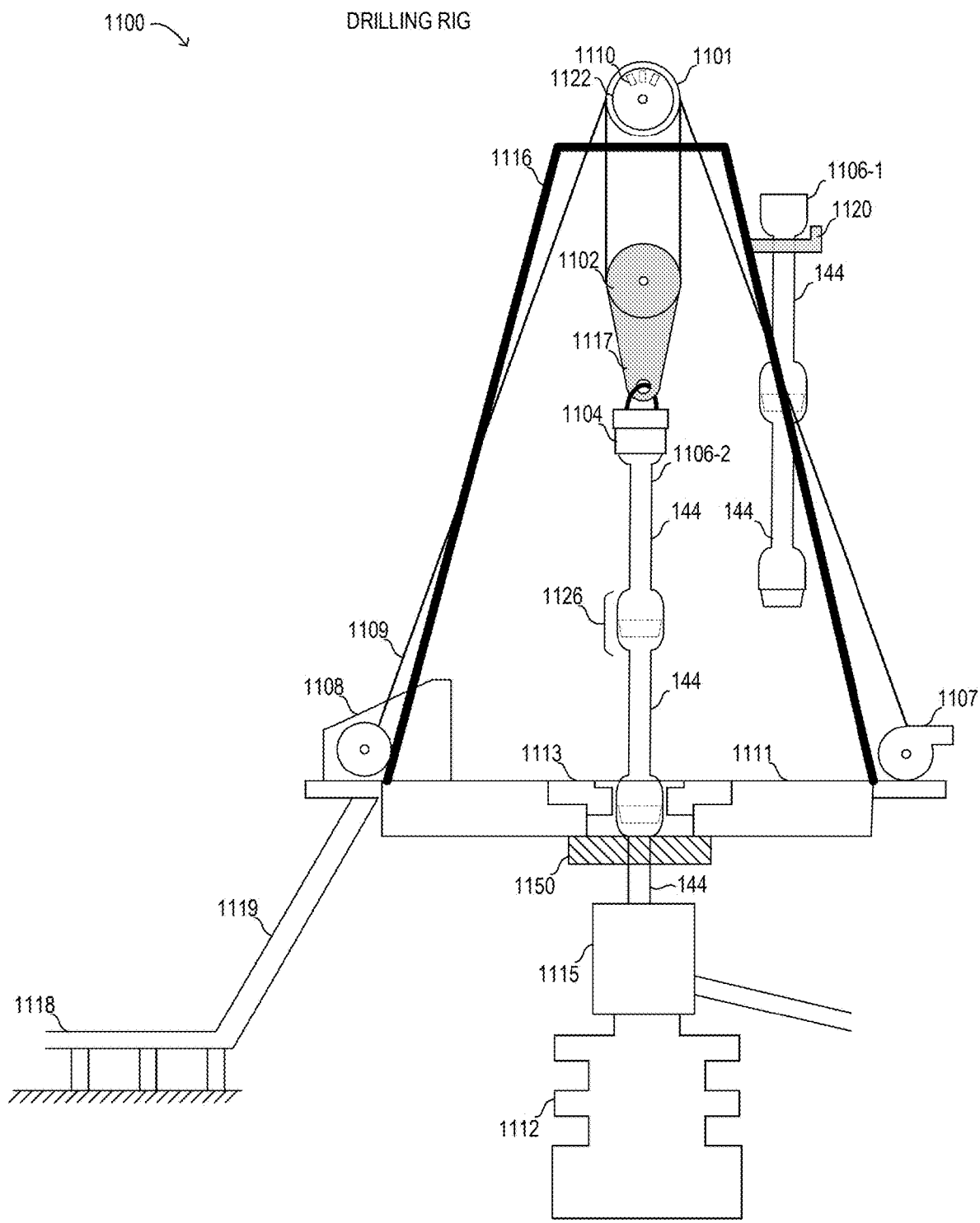
FIG. 11 is a schematic illustration of a drilling rig with various components and moving parts including a pipe tally system.

Referring now to FIG. 11, a drilling rig 1100 is depicted in schematic form. As shown, in FIG. 11, drilling rig 1100 includes a derrick 1116 depicted having a travelling block 1102 that is suspended with a cable 1109 reeved through a crown block 1101. Cable 1109 may be anchored at a deadline anchor 1107 and may be tensioned and driven using a draw works 1108. As shown, travelling block 1102 supports a top drive 1104 through a hook 1117. Top drive 1104 may include a swivel and top drive system. A supply of drill pipe stands (not shown) are stored on a pipe rack 1118 from where the drill pipe stands are picked through a pipe ramp 1119 and are placed onto a monkey board 1120. Monkey board 1120 may hold a number of drill pipe stands, including a first drill pipe stand 1106-1 that is ready to be used and can be accessed by top drive 1104. By lowering travelling block 1102, top drive 1104 may move downward and is shown carrying a second drill pipe stand 1106-2 that is threaded to drill string 146 into the borehole using rotary table 1113. Drill pipe stands 1106 are shown as so-called 'doubles' comprising two individual drill pipes 144, however it will be understood that a drill pipe stand, as used herein, may comprise different numbers of individual drill pipes 144, such as 3 drill pipes 144, among other variants. Below rotary table 1113 at the wellhead, a bell nipple 1115 and a blowout preventer (BOP) stack 1112 are visible in drilling rig 1100.

Also shown installed on drilling rig 1100 is a pipe tally system 1150 that may be mounted under rig floor 1111 just below rotary table 1113 and above BOP stack 1112 with clearance from bell nipple 1115. It will be understood that other types of mounting arrangements and locations for pipe tally system 1150, or selected portions thereof, may be used in different embodiments. As shown, upon being lowered into the borehole by travelling block 1102, second drill pipe stand 1106-2 will pass through pipe tally system 1150 where automatic counting of individual drill pipes 144 in drill pipe stand 1106 is performed, such as by repeatedly detecting a joint portion 1126 between each drill pipe 144. A radial magnetic sensor 1110 may be installed on crown block 1101 to measure the rotation of a pulley 1122 (see also FIGS. 20, 21A, 21B). Radial magnetic sensor 1110 can be a reed switch that senses magnets mounted around a fast line sheave at regular intervals, thereby enabling a rotational speed of pulley 1122 to be measured. A total displacement of travelling block 1102 may then be estimated by a number of rotations of pulley 1122 (either integer or real numbers of rotations) multiplied by a circumference of pulley 1122, and divided by a number of reeved cables between travelling block 1102 and crown block 1101.

Figure 12:
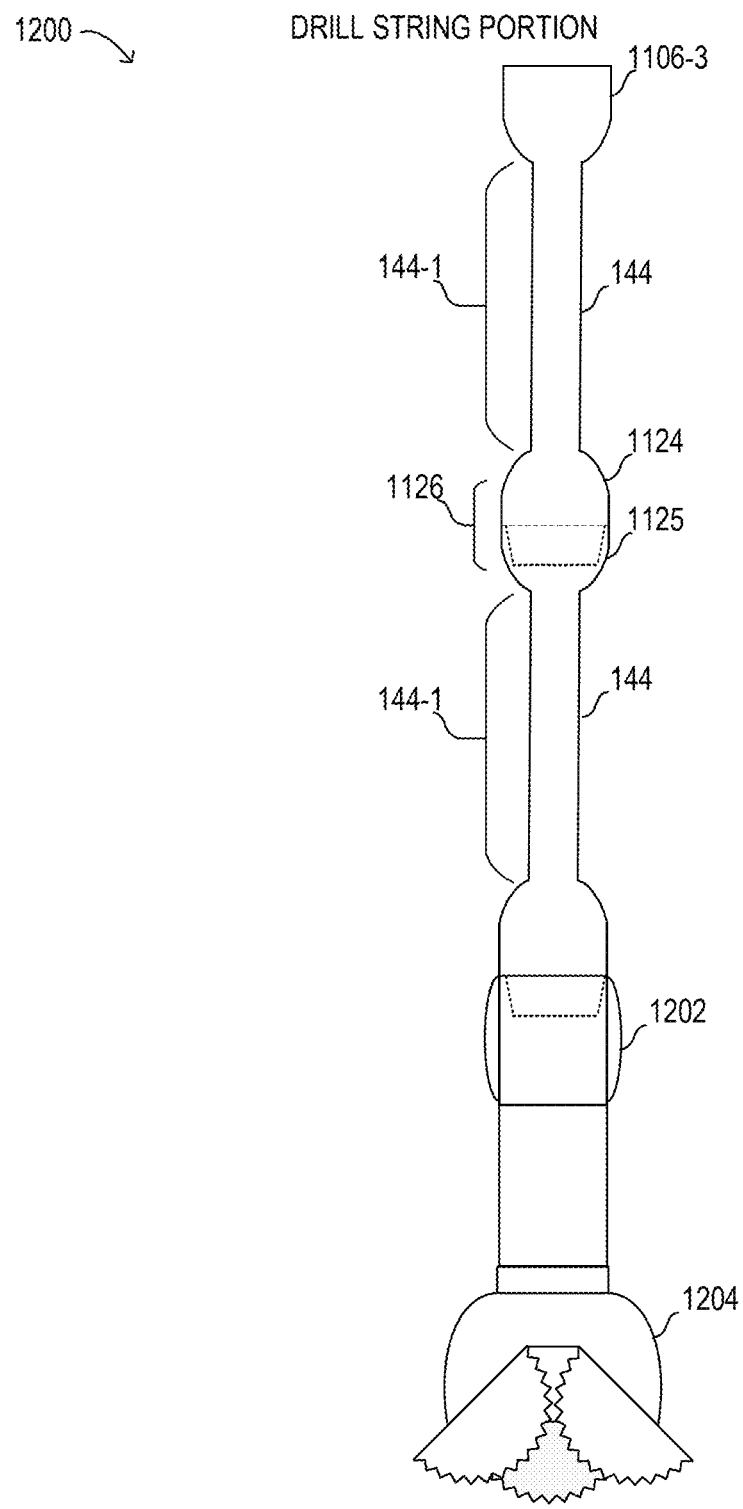
FIG. 12 is a schematic illustration of a drill string with a drill bit, a BHA, a pipe joint, and drill pipe.

Referring to FIG. 12, a drill string portion 1200 is shown including a BHA 1202 having various components that may represent a wide range of dimensions and may be mounted on a third drill pipe stand 1106-3. It is noted that FIG. 12 is a schematic illustration and is not necessarily drawn to scale or perspective. Drill string portion 1200 may be a distal portion or a terminal portion of drill string 146. A drill bit 1204 may be the widest component on drill string 146 and may limit the outer diameter of components mounted to BHA 1202. Further visible details of third drill pipe stand 1106-3 as shown include a box 1125 and a pin 1124 (e.g., forming joint portion 1126) that are at respective ends of each drill pipe 144, and accordingly, at respective ends of each drill pipe stand 1106. Visible in FIG. 12 is joint portion 1126 having a larger diameter than a smaller diameter of a tube section 144-1 of drill pipe 144 to which joint portion 1126 is attached at either end. It is noted that boxes 1125 are shown facing up to surface 104, while pins 1124 are shown facing downhole on the lower end of each respective drill string component. In certain embodiments, different threading arrangements and threading orientations may be used without limitation.

Figure 13A:
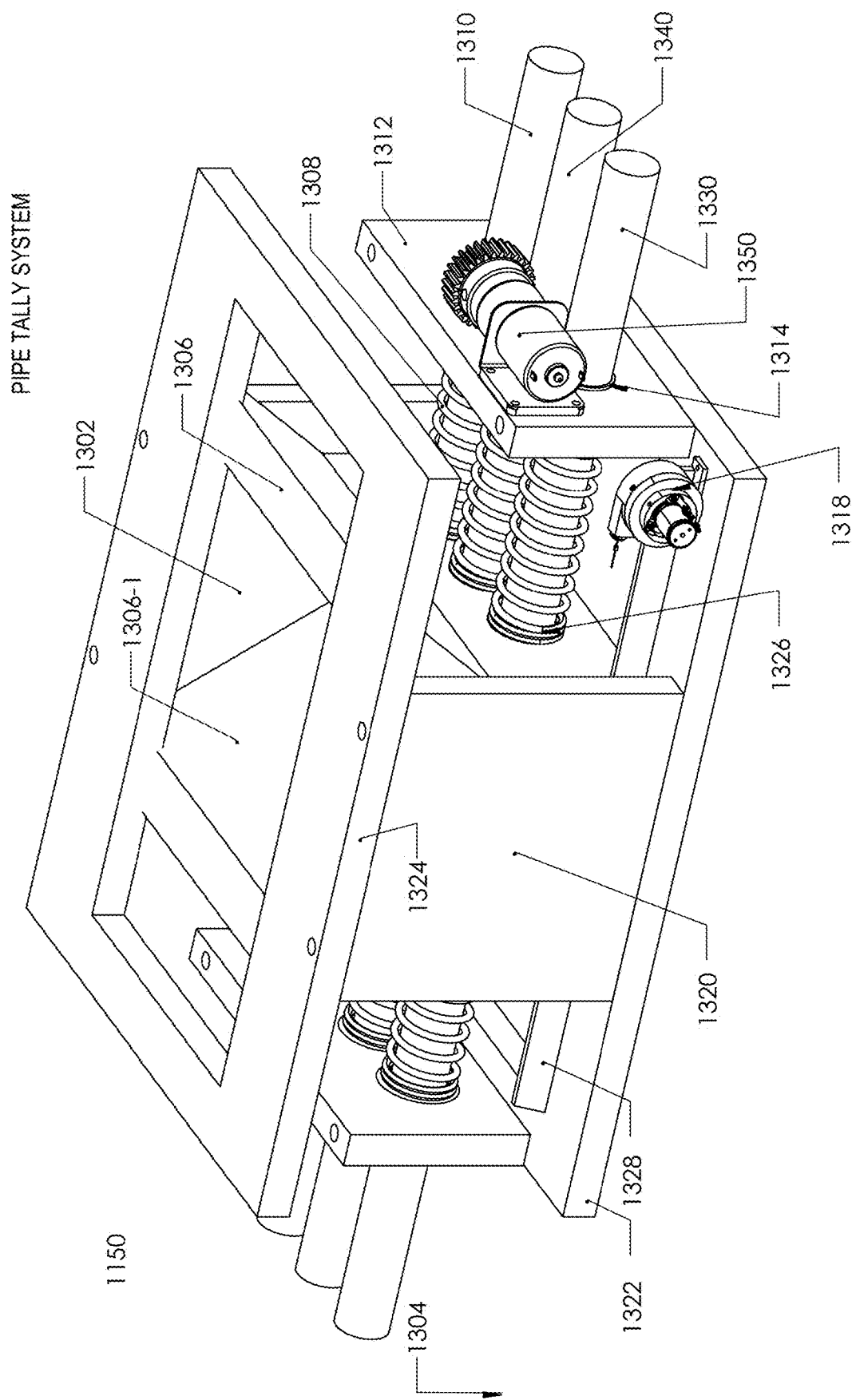
FIGS. 13A, and 13B are depictions of a pipe tally system with various mechanical components and a measuring system.
Figure 13B:
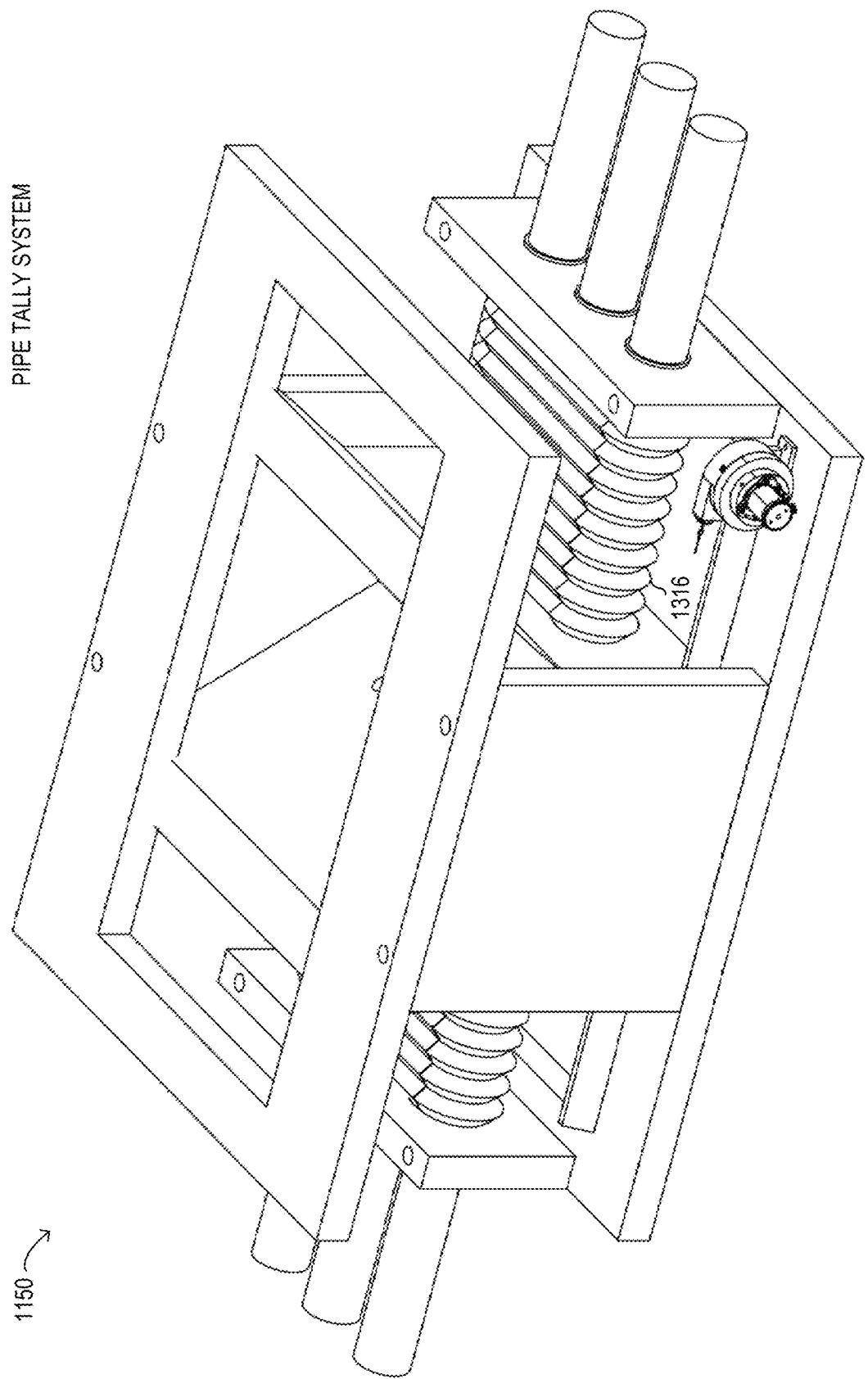

Referring to FIGS. 13A, and 13B, one implementation of pipe tally system 1150 is shown in a perspective view. It is noted that FIGS. 13A, and 13B are schematic illustrations and are not necessarily drawn to scale or perspective. In one embodiment, pipe tally system 1150 may be implemented as a machine having external dimensions about 25 inches in width, about 25 inches in length, and about 10 inches in height. It will be understood that pipe tally system 1150 may be implemented in different mechanical formats and layouts, and accordingly different dimensions, in various embodiments.

In operation, pipe tally system 1150 may provide an input sectional area 1302 that can be dimensioned to allow for various sizes of equipment and drill string components and different rig conditions, in different embodiments. In particular embodiments, input sectional area may be dimensioned 20 inches by about 20 inches in size that can allows for various different and common drill string components to be used with pipe tally system 1150 and can pass through pipe tally system 1150 in a downhole direction as given by an arrow 1304.

Also visible in FIG. 13A and included with pipe tally system 1150 are two sliding blocks 1306 that can move parallel to each other in a common plane. In a rested state sliding blocks 1306 may be centered and in contact with each other in a position that marks a "zero" displacement state or a "ground state" for pipe tally system 1150. A series of springs 1308 that facilitate an in-plane motion of sliding blocks 1306 may be in compression at the ground state, because each sliding block 1306 can move through an entire measuring range of pipe tally system 1150 to allow for radial motion of the pipe. As shown, sliding blocks 1306 have a top face portion 1306-1 that may be inclined at 35° to the vertical axis for a smooth entry of drill string 146 at the start of a drilling operation (see also FIG. 14). In particular embodiment, top face portion 1306-1 may be formed using a polyimide layer for durability and low friction, while providing protection against damage to drill string 146. It is noted that top face portion 1306-1 may be equipped with different coverings and layers for particular applications in different embodiments. Sliding blocks 1306 may also have a bottom face portion 1306-2 (not visible in FIGS. 13A and 13B, see FIG. 14) that is inclined steeper than top face portion 1306-1, since bottom face portion 1306-2 may experience a smaller total displacement while pulling drill string 146 out of borehole 106. Additionally, sliding blocks 1306 may further include a fillet 1306-3 (not visible in FIGS. 13A and 13B, see FIG. 14) at a center portion that allows for a smooth contact surface between drill string 146 and pipe tally system 1150.

In some examples, the sliding blocks may be formed of or may include materials to reduce wear on drilling pipes while sliding through the pipe tally mechanism. The sliding blocks may include sacrificial or replaceable jaws or wear surfaces, for example formed of TEFLON® plastic, and other material suitable for soft jaw applications. Additionally, the shape of the sliding blocks may be different than pictured in the figures, specifically shaped to reduce wear, especially on drilling pipes. The sliding blocks may include V-shaped jaws on the faces or curved surfaces to accommodate the shape of the drill pipe without applying undue stress at a single location. The sliding blocks may, for example contact a greater surface area of the drilling pipes as they pass through. In some examples the sliding blocks may include rollers, bearings, ball contacts, or other rotating or moving surfaces to further reduce friction against the drilling pipes and thereby reduce wear.

Each sliding block 1306 may be supported by 3 plunger units 1310 attached at a plunger base 1326, each plunger unit 1310 respectively comprising a spring 1308 for a smooth motion and stiffness and a plunger shaft 1330 (see also FIG. 15A and FIG. 15B) that is fixed and supports spring 1308. Pipe tally system 1150 may further be constructed using two respective end plates 1312 that form a support or a mechanical constraint for plunger units 1310. In operation, springs 1308 may be compressed against end plate 1312, while plunger shaft 1330 slides through end plate 1312 via respective clearance holes 1602 (populated by plunger shaft 1330 in FIGS. 13A and 13B, see also FIG. 16). A gasket 1314 on each clearance holes 1602 may ensure smooth motion of plunger shaft 1330 and may prevent contaminants from entering an interior portion of pipe tally system 1150. In various embodiments, gasket 1314 may be made using a low friction material that supports sliding of plunger shaft 1330 through gasket 1314 in continuous operation of pipe tally system 1150, such as at least one of an elastomer, an elastomer compound, a rubber, polytetrafluoroethylene (PTFE), nylon, polyamide, among other suitable materials.

In FIG. 13B, which is substantially similar to FIG. 13A and depicts substantially similar elements as FIG. 13A, pipe tally system 1150 is shown with bellows 1316 to prevent exposure to contaminants that may wear mechanical surfaces of plunger units 1310.

Additionally, two side plates 1320 at respective sides of pipe tally system 1150 may be mounted upon a base plate 1322 and may act as support pillars for a cover plate 1324 that house the interior components, as shown. Side plates 1320 may accordingly be attached to cover plate 1324 and base plate 1322. Base plate 1322 and cover plate 1324 may be identically sized in some implementations. End plates 1312 may be mounted at the edge of base plate 1322 bolted by two or more screws or other types of fasteners, or by any of a variety of different bonding methods, as desired. Pipe tally system 1150, as shown, may further comprise two guide rails 1328 mounted to base plate 1322 that work as guides for sliding blocks 1306. The vertical motion of sliding blocks 1306 may be restricted between cover plate 1324 and base plate 1322.

In operation of pipe tally system 1150, a drill string may pass through input sectional area 1302 during drilling operations in a drilling rig. Drill string 146 may pass downwards (downhole) or upwards (to the surface) through input sectional area 1302. As drill string 146 passes through input sectional area 1302, sliding blocks 1306, under force from springs 1308, will push against drill string 146 from either side, and have a central point of contact with drill string 146. The central point of contact of sliding blocks 1306 with drill string 146 will capture the changing diameter of drill string 146 and will result in corresponding motion of the sliding blocks 1306 as the diameter of drill string 146 changes at joint sections 1126. For example, when tube portion 144-1 passes between sliding blocks 1306, sliding blocks 1306 will be spaced closer together against drill string 146 than when joint sections 1126 (having a larger diameter) pass through sliding blocks 1306. In this manner, a back and forth motion of sliding blocks 1306 will occur as individual joint sections 1126 pass through pipe tally system 1150. The back and forth motion of sliding blocks 1306 may be measured by proximity sensors 1318 mounted to end plate 1312 and may be recorded by a data processing system or other means of registering signals from proximity sensors 1318 over time. With knowledge of the speed of travel of drill string 146 obtained from the sensors mounted on crown block 1101, the changes in diameter measured using sliding blocks 1306 can be correlated to drill string 146 velocity along the drilling axis, which can yield a measurement of the length of drill pipes 144.

Figure 15A:
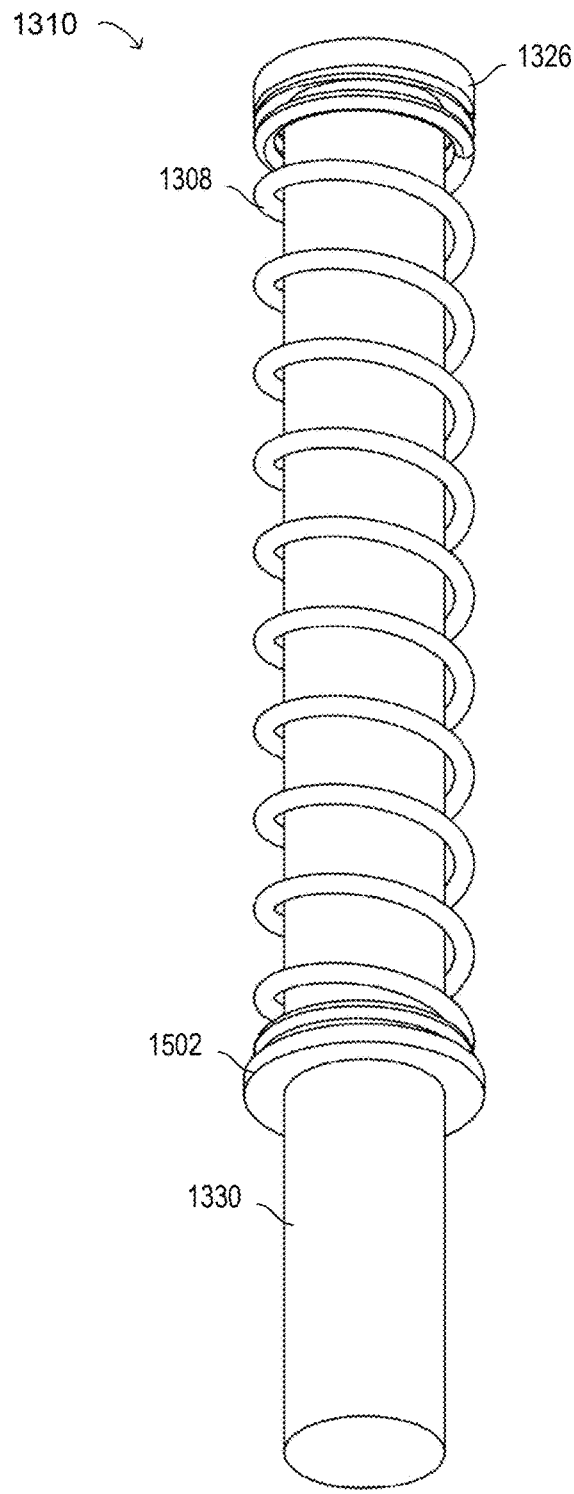
FIGS. 15A and 15B are depictions of plunger units included with a pipe tally system.
Figure 15B:
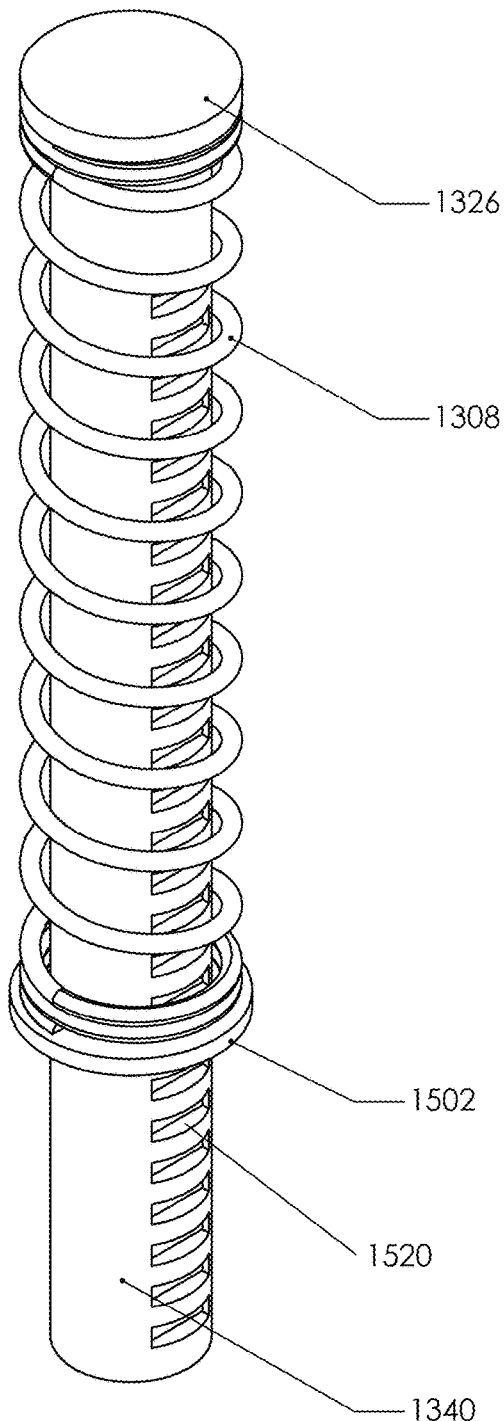

The motor 1350 of FIG. 13A takes in a command from a computing device in response to the reading from the proximity sensor 1318 and drives the segregated plunger 1340, shown in FIG. 15B, pulling the mechanism backward in a "loaded" position. When the proximity sensor 1318 shows that there is no pipe passing through the mechanism (ground state) the motor 1350 pulls the mechanism back by applying a force to the segregated plunger 1340 via a geared or toothed wheel connected to motor 1350. This allows the system to be ready for the next trip-in cycle while preventing the potential damage to the mechanism from drill bit impact during insertion. Readings from the proximity sensors 1318 can also be used to identify when the BHA unit starts to move through the mechanism during trip-out signaling the motor to retreat to allow unrestricted pullout of the drill bit without contact or sliding. Other modifications can include the use of other sensors either mounted on the mechanism or externally on the rig that commands the system to promptly trigger the "loading" position during tripping as needed.

In some examples, the motor 1350 may be other actuation devices other than an electric motor, for example, the motor 1350 may be replaced by a hydraulic system, a hydraulic motor, a pneumatic system, a linear actuator, and other such actuating mechanisms known to those with skill in the art. In some examples it may be beneficial to use non-electric systems to provide a holding force against the springs to keep the mechanism in an open configuration and ready for the next trip in cycle.

In some examples, the motor 1350 or other actuation device in place of the motor may incorporate or be accompanied by a latch mechanism or device to engage with the grooves of the 1520 of the plunger unit 1340 (shown in FIG. 15B below) to maintain or resist movement of the plunger unit and mechanism while in a steady state position. For example, to maintain the mechanism in an open position, the plungers and springs may be held such that the mechanism is open to allow for pipes to pass through uninhibited or for maintenance or other purposes. The latch may engage with the plunger to resist closure of the mechanism and enable the motor or other actuation device to shut off rather than run in a steady state mode, which may result in a burn out of an electric motor.

FIGS. 14, 15A, 15B 16, 17, and 18 show further details of various components of pipe tally system 1150 described above.

Figure 14:
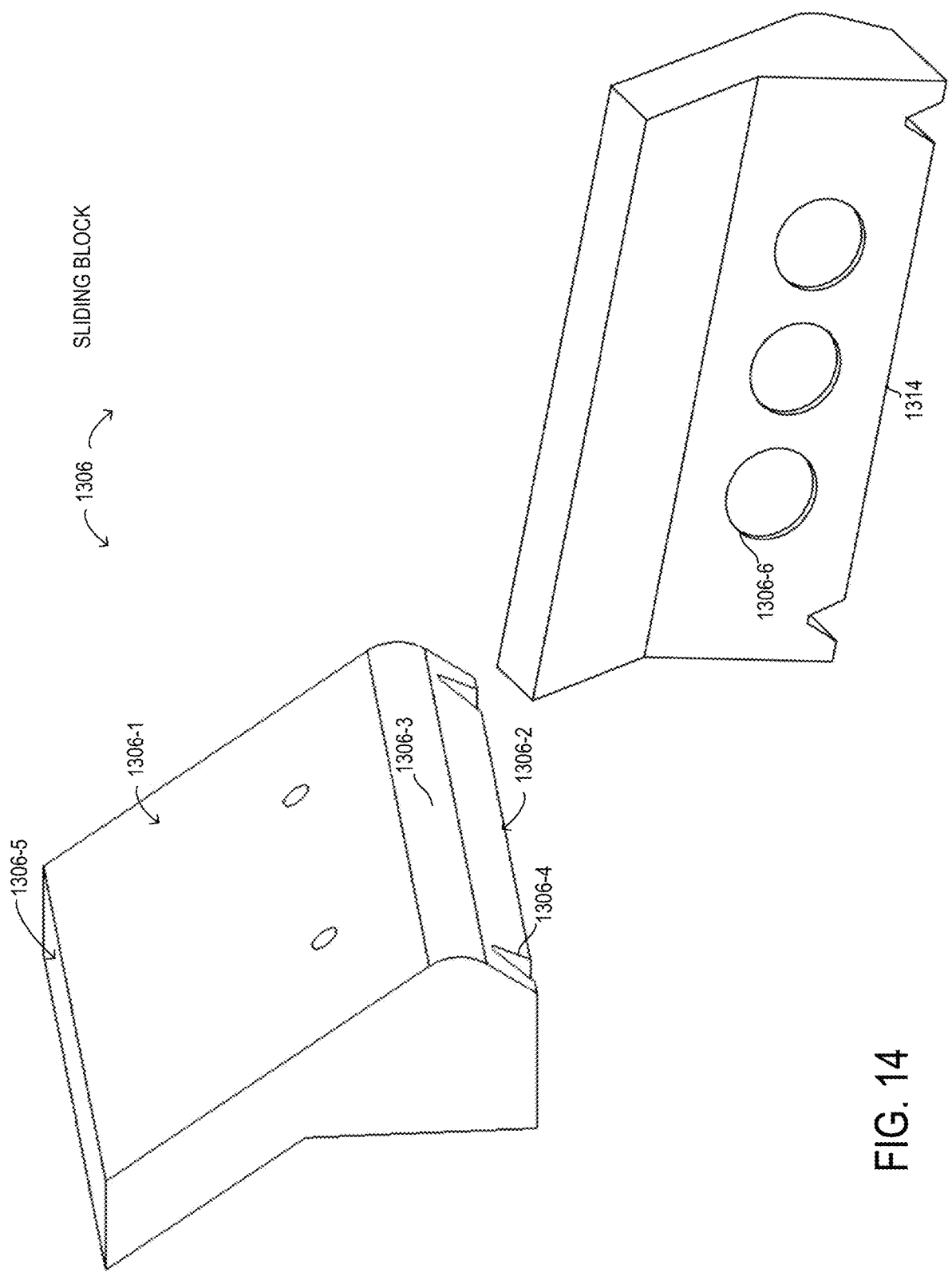
FIG. 14 is a depiction of a sliding block included with a pipe tally system.

Referring to FIG. 14, a sliding block 1306 is shown isolated in a front view and a rear view. Visible in FIG. 14 is a top surface portion 1306-5 that is flat and may be flush with the cover plate 1324 when pipe tally system 1150 is assembled Plunger unit 1310 may be secured on the back of sliding block 1306, such as by using threaded fasteners (not shown) or another type of fastening or bonding method. Also visible in FIG. 14 is top face portion 1306-1. The body of sliding block 1306 may be made of metal upon which top face portion 1306-1 may be mounted to provides strength to sliding block 1306 and a smooth slide surface. Top face portion 1306-1 may be attached on the metal body of sliding block 1306 and may serve as a sacrificial protective layer. Bottom face portion 1306-2 is shown including grooves 1306-4 that may mate with rails 1328 and may enable supporting of plunger base 1326. At the back face of sliding block 1306 shown in the lower right, openings 1306-6 for aligning with and attaching to plunger units 1310 at plunger base 1326 are visible.

In FIG. 15A, plunger unit 1310 included with pipe tally system 1150 is shown in greater detail. In FIG. 15A, plunger unit 1310 is shown with plunger base 1326 at one end providing an attachment location for one end of spring 1308. Plunger base 1326 may be attached to a back of sliding block 1306, such as at openings 1306-6 (see FIG. 14). Spring 1308 may have a slightly larger helical diameter than an outer diameter of plunger shaft 1330, so as to enable spring 1308 to operate in cylindrical circumference of plunger shaft 1330, as shown. Spring 1308 may be selected with a suitable spring constant for desired smooth operation of sliding blocks 1306 against portions of drill string 146, such as in a manner imparting a minimum interference and radial force against drill string 146. The selection of the suitable spring constant for spring 1308 may also result in minimized wear of top face portion 1306-1 due to the optimized or minimized interaction of sliding blocks 1306 with drill string 146 during operation of pipe tally system 1150. At an opposing end of spring from plunger base 1326 a spring base 1502 provides another attachment for spring 1308. Spring base 1502 may be affixed to end plate 1312. In operation, plunger shaft 1330 is free to move through clearance holes 1602 formed in end plate 1312 as sliding blocks 1306 move back and forth in response to variations in diameter of drill string 146, while springs 1308 provide a pressure force that maintains constant contact of fillet 1306-3 with the drill string 146 at all times, thereby enabling the motion of sliding plates 1306 to continuously indicate a current diameter of the drill string 146.

Referring to FIG. 15B, plunger unit 1340 included with pipe tally system 1150 is shown in greater detail. In FIG. 15B, the plunger unit 1340 includes plunger base 1326, spring 1308, and spring base 1502 are included as shown and described above with respect to FIG. 15A. The plunger unit 1340 includes grooves 1520 along the length of the plunger unit 1340. The grooves 1520 interact with a geared or toothed wheel connected to motor 1350 as described above. The grooves 1520 enable the motor 1350 to drive the location of the plunger unit 1340 according to one or more commands from a computing device.

Figure 16:
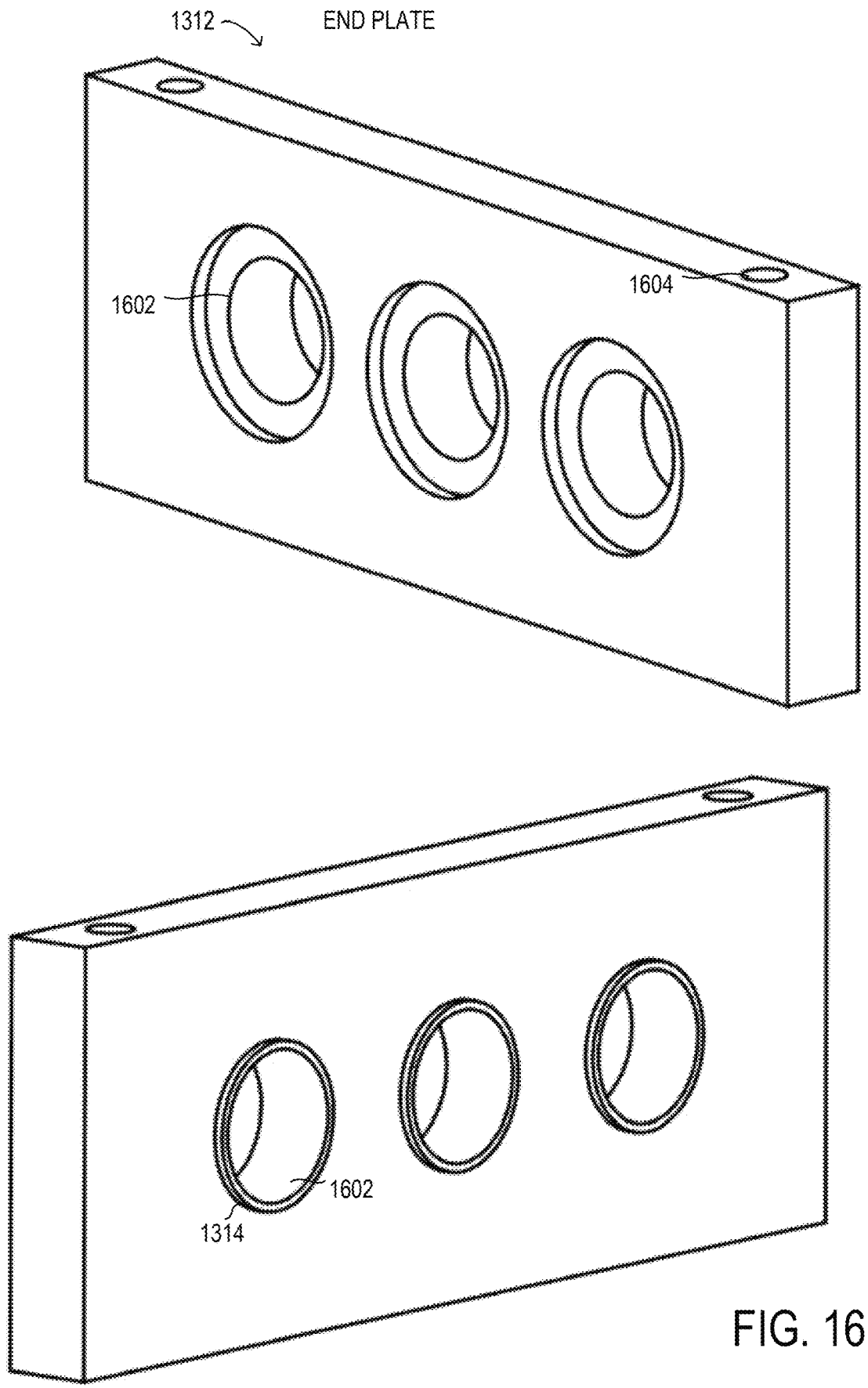
FIG. 16 is a depiction of an end plate included with a pipe tally system.

Referring to FIG. 16, end plate 1312 is shown in further detail in two respective isolated views from front (upper view) and rear (lower view). As noted previously, end plate 1312 provides support for plunger units 1310 and allows for a smooth motion of plunger shaft 1330 while providing a fixed surface against which spring 1308 may provide force to sliding block 1306. Each end plate 1312 is shown with three clearance holes 1602 for a respective assembly having three plunger units 1310 for one sliding block 1306, corresponding to the configuration shown in FIGS. 13A and 13B. It is noted that in other implementations, a different number of plunger units, differently dimensioned plunger units, or a different type of mechanism, such as pressurized gas cylinders, or other spring arrangements may be used to press sliding blocks 1306 together for operation of pipe tally system 1150. As shown, end plate 1312 may be fixed to base plate 1322 using two mounting through holes 1604 that may mate with corresponding holes in base plate 1322 (not shown). It will be understood that other methods of securing end plate 1312 and base plate 1322 may be practiced in different embodiments. Also visible in FIG. 16 are gaskets 1314 that are installed in each respective clearance hole 1602 (see also FIG. 13A).

Figure 17:
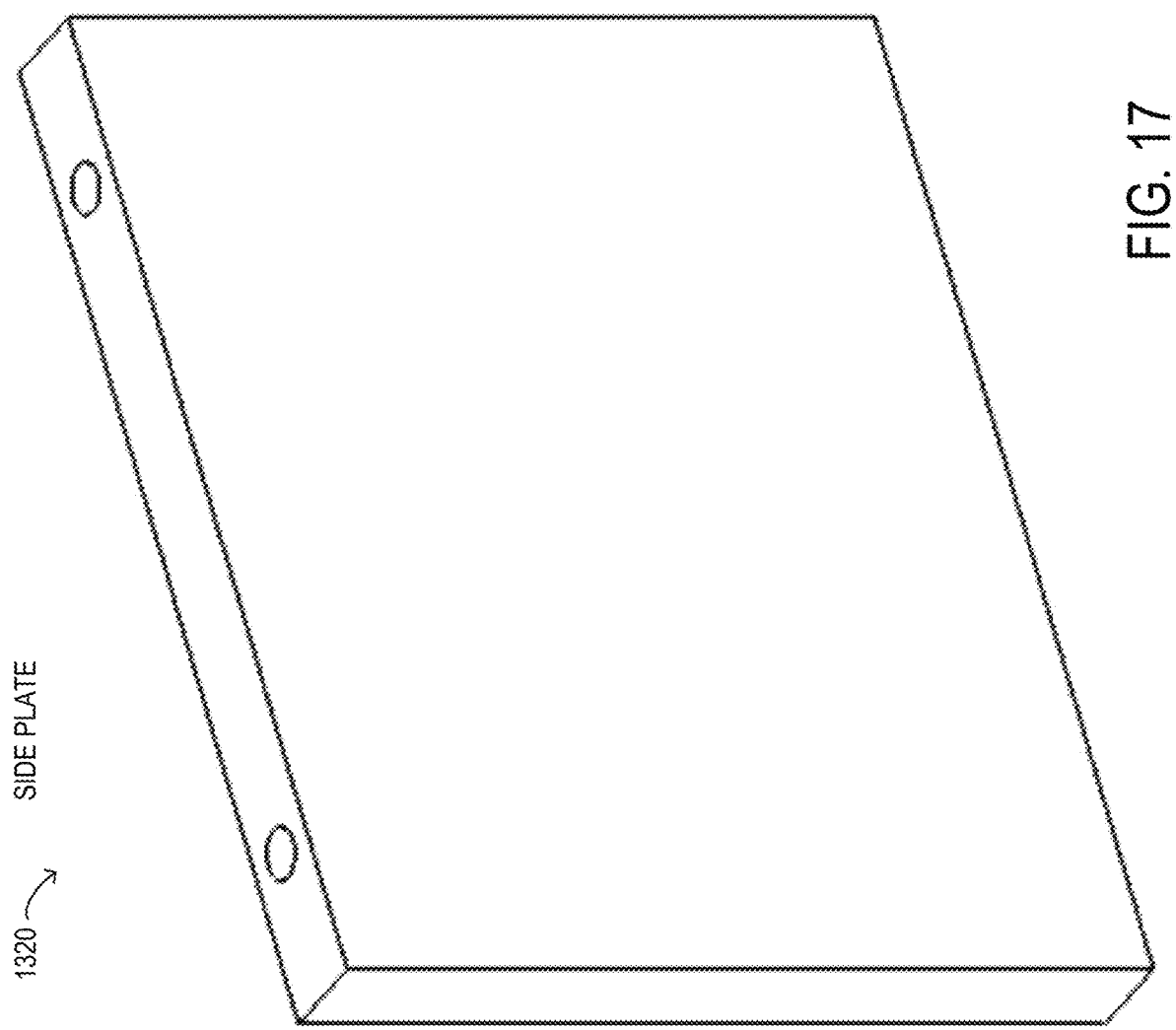
FIG. 17 is a depiction of a side plate included with a pipe tally system.

FIG. 17 shows side plate 1320 in further detail that is located at respective sides of pipe tally system 1150 and may be mounted upon base plate 1322 and may act as support pillars for a cover plate 1324. As with other components of pipe tally system 1150, side plates 1320 may be mounted to base plate 1322 using threaded holes and fasteners, or using another type of fastening or bonding method.

Figure 18:
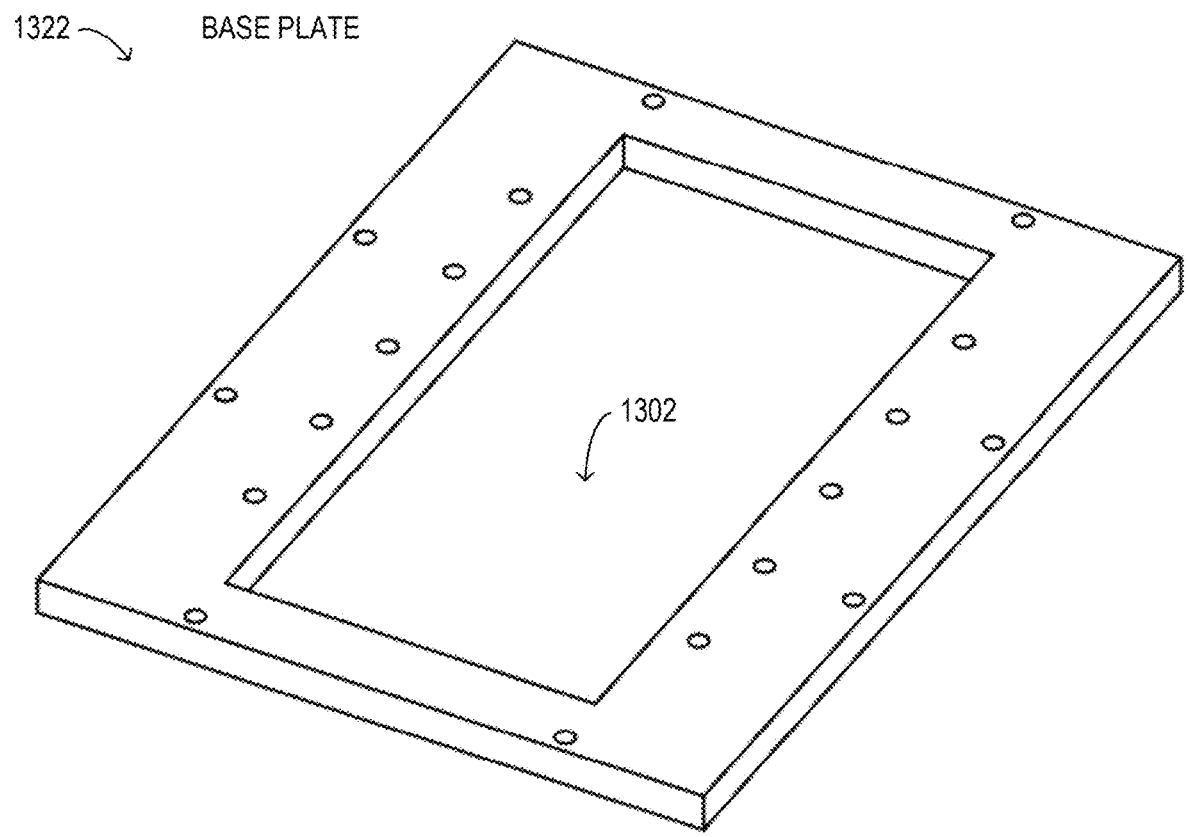
FIG. 18 is a depiction of a base plate included with a pipe tally system.
Figure 19:
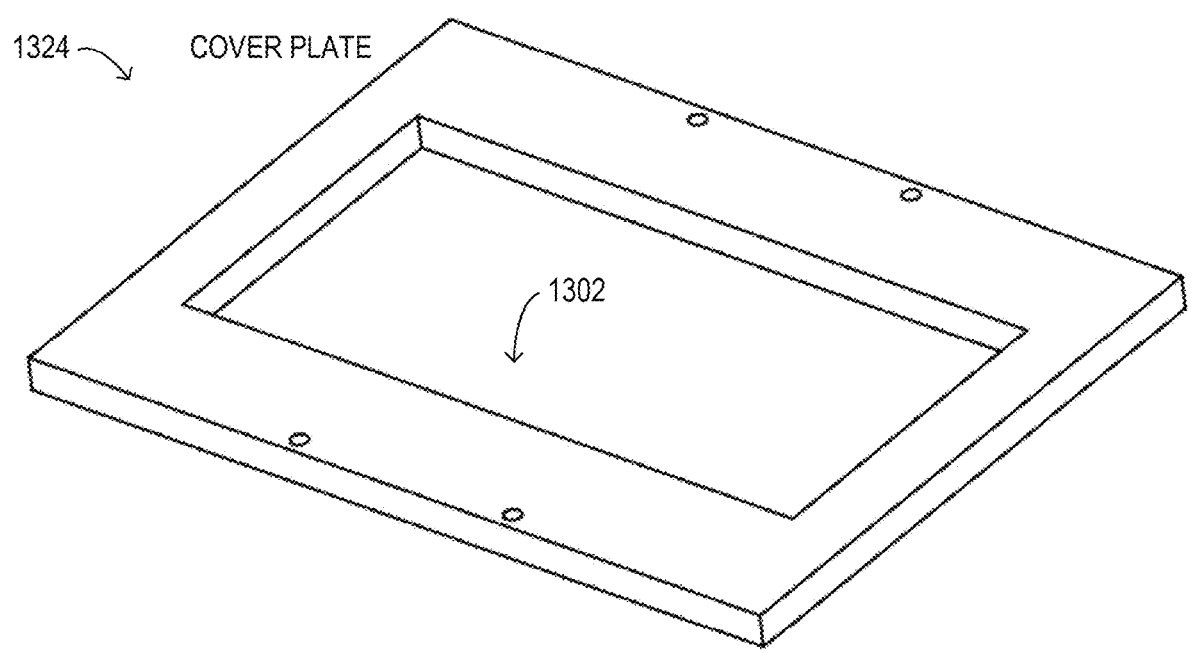
FIG. 19 is a depiction of a cover plate included with a pipe tally system.

FIG. 18 shows base plate 1322 while FIG. 19 shows cover plate 1324 in greater detail. As noted, other components of pipe tally system 1150 may be supported by base plate 1322, shown with corresponding mounting holes, and may provide structural rigidity to pipe tally system 1150. In various embodiments, base plate 1322 and cover plate 1324 may have identical outer dimensions that define outer dimensions of pipe tally system 1150. Also visible in FIGS. 18 and 19, respectively, is input sectional area 1302 through which drill string 146 passes through during operation of pipe tally system 1150. As shown, base plate 1322 may support end plate 1312 and side plate 1320 mounted at respective edge portions, as shown previously. Guide rails 1328 for sliding blocks 1306 may be fixed to base plate 1322. Additionally, cover plate 1324 may provide an attachment area for securing pipe tally system 1150 to drilling rig 1100, such as to the bottom of rig floor 1111, or at another suitable location.

Figure 20:
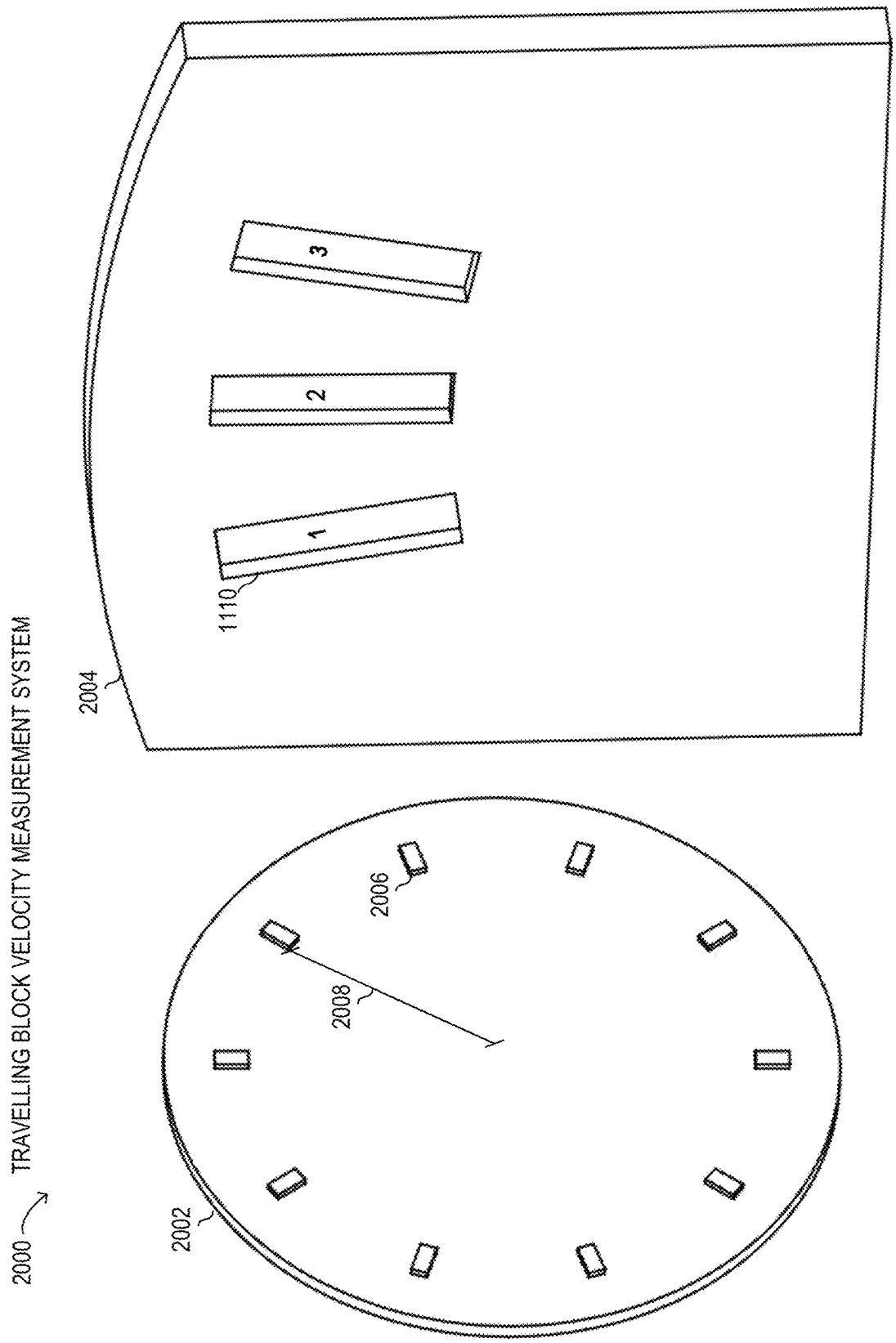
FIG. 20 is a depiction of a travelling block velocity measurement system included with a pipe tally system.

FIG. 20 shows various elements that form a travelling block velocity measurement system 2000 that is shown comprising a magnetic plate 2002 and a crown sensor 2004. Magnetic plate 2002 may have a number of magnets 2006 placed radially apart at certain angular intervals and may be enabled to rotate about an axis of crown block 1101, such as by being mounted to pully 1122 (see FIG. 11). In particular embodiments, as shown in FIG. 20, magnetic plate may have 10 magnets mounted along a common radius 2008 about the axis of crown block 1101 at 36° intervals. Correspondingly, crown sensor 2004 may include a number of radial magnetic sensors 1110, numbered in a particular order as 1, 2, 3, and may be mounted in alignment with the axis of crown block 1101, such as at a periphery of magnetic plate 2002. In particular embodiments, radial magnetic sensors 1110 are reed switches and are oriented 12° apart in a radial manner corresponding to the axis of crown block 1101, which may enable a radial resolution of 12° for measuring crown block speed as an angular velocity. With knowledge of a diameter of pulley 1122 and the crown block speed, a travel distance and a direction of travel of cable 1109, and correspondingly, of travelling block 1102, can be determined.

Figure 21A:
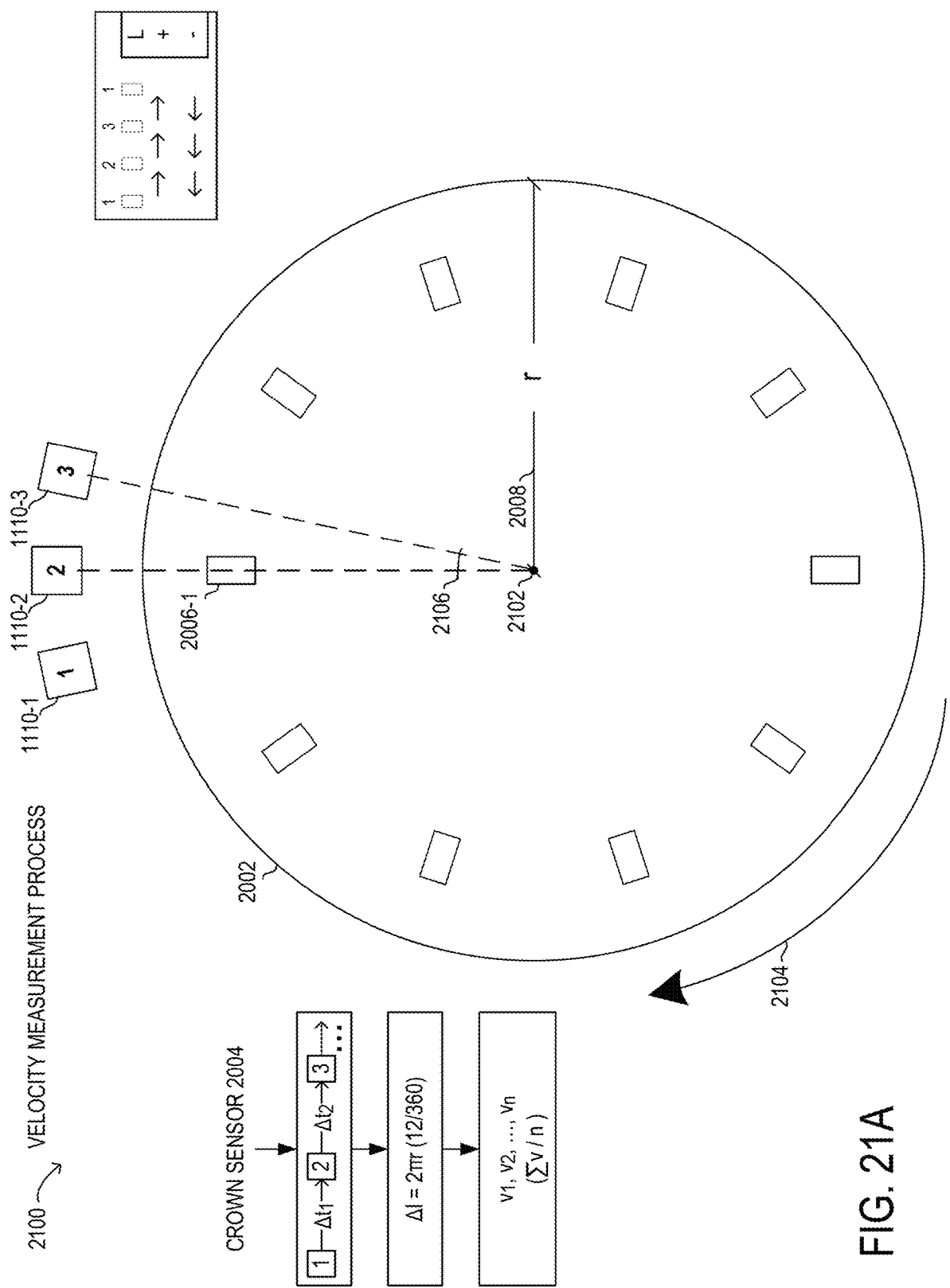
FIG. 21A illustrates a velocity measurement process using a pipe tally system.
Figure 21B:
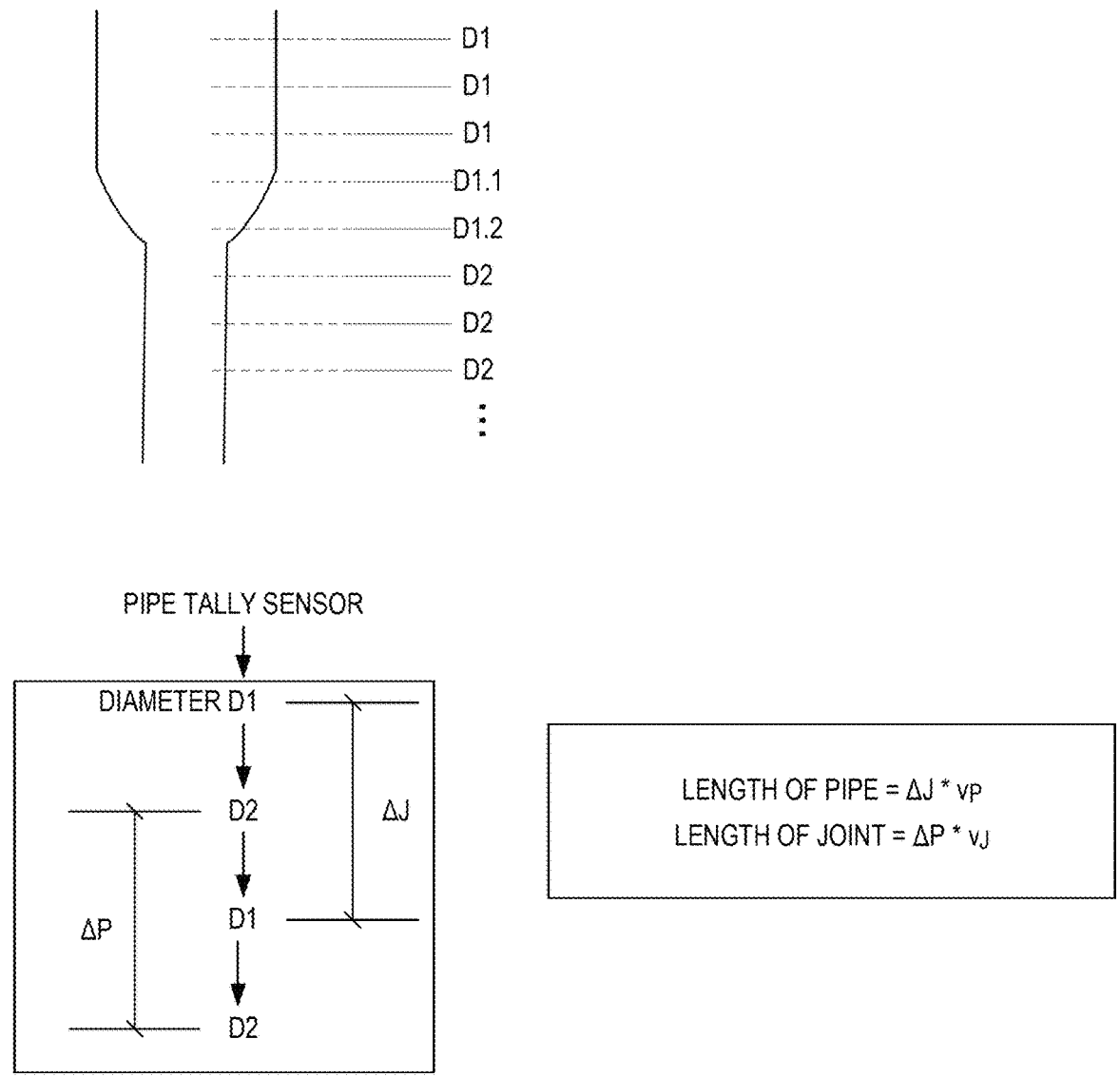
FIG. 21B illustrates a length measurement process using a pipe tally system.

FIGS. 21A and 21B depict a process for along hole depth measurement using travelling block velocity measurement system 2000, as shown previously. In FIG. 21A, a process 2100 for velocity measurement using radial magnetic sensors 1110 and magnets 2006 is illustrated. In process 2100, it is assumed that magnetic plate 2002 rotates about an axis 2102 in a direction given by arrow 2104. When magnet 2006-1 comes in proximity with a first sensor 1110-1 (not shown), sensor 1110-1 may be activated an may generate an output signal that is recorded using the data processing system. After a further rotation in direction 2104 of magnetic plate 2002 of an angle of resolution 2106 (e.g., 12° in the non-limiting exemplary arrangement shown) of magnetic plate 2002 (corresponding to further rotation of pulley 1122), magnet 2006-1, as shown in FIG. 21A, may come in proximity of a second sensor 1110-2, which may, in response, send a second signal to the data processing system. Then, after further rotation, magnet 2006-1 may comes in proximity of a third sensor 1110-3, which may, in response, send a third signal to the data processing system. As each respective magnet 2006 passes in proximity to respective radial magnetic sensors 1110, the same operations may be repeated to generate a series of timing signals known to originate at particular radial magnetic sensors 1110. A sequence of the timing signals originate at respective radial magnetic sensors 1110 may indicate a direction of angular displacement of magnetic plate 2002, and hence, a direction of motion of travelling block 1102, as well as a magnitude of the angular velocity of magnetic plate 2002, corresponding to a linear speed of travelling block 1102. For example, a time interval between the second signal and the first signal may be measured as $\Delta t_1$, while a length interval $\Delta l$ that travelling block 1102 travels during time interval $\Delta t_1$ may be calculated by $\Delta l = 2\pi r(12/360)$, where r is radius 2008 and a 12° angular resolution is assumed. Then a linear velocity $v_1$ may be calculated as $v_1 = \Delta l/\Delta t_1$. In this manner, respective linear velocities $v_2, \ldots, v_n$ may be calculated in an ongoing manner, and may be used to determine an average linear velocity over a desired period of time, as shown, of travelling block 1102.

If sensor activation moves in a forward order sequence 1→2→3→1→2→3→1, the distance traversed by travelling block 1102 is cumulated. When the forward order sequence is disrupted, pipe tally system 1150 may determine that a negative displacement of travelling block 1102 has occurred and may subtract the negative distance from the distance cumulated for forward displacement. In this manner, systematic and random errors in the displacement of travelling block 1102 may be compensated. The systematic and random error may include errors due to wind on block height line, inertia, and rig vertical motion, such as in case of offshore drilling.

The velocity measurements obtained using process 2100 may be further used to measure a length of each drill pipe 144, such as when drill pipe 144 is under tension while tripping into borehole 106.

In FIG. 21B, a process 2101 for length measurement is depicted. As described above with respect to process 2100, time intervals $\Delta t_1$ may be used to calculate an average linear velocity of travelling block 1102. The average linear velocity of travelling block 1102, which is also the same linear velocity of drill string 146, can be correlated with output signals from proximity sensors 1318 in pipe tally system 1150. The output signals from proximity sensors 1318 may identify joint portions 1126 from a positive diameter variance with respect to the diameter of tube sections 144-1, as described previously, and in particular, may providing timing synchronization for a time between joint portions 1126. For example, as shown in FIG. 21B, a diameter D1 may correspond to joint portion 1126, while diameter D2 may correspond to tube section 144-1, while diameters D1.1, D1.2, D1.3 may correspond to transitional diameters at neck portions of joint portion. It is noted that measurements collected by pipe tally system 1150 may vary in sampling rate and regularity. For example, pipe tally system 1150 may sample diameters at a fixed sampling rate, or using a variable sampling rate, such as by increasing a number of diameter measurements at joint portions 1126 to improve the detection of any transition (e.g., change in diameter) between joint portion 1126 and tube sections 144-1. Because proximity sensors 1318 may generate continuous or low sample interval measurements, a time of each diameter measurement can be correlated with the average velocity measured using process 2100. Then, a joint time interval $\Delta J$ times an average pipe velocity $v_P$ may yield a length of pipe measurement, while a pipe time interval $\Delta P$ times an average joint velocity $v_J$ may yield a length of joint measurement. Because pipe tally system 1150 is enabled to continuously operate as drill string 146 is lowered into borehole 106, a total pipe tally for drill string 146 may be recorded and maintained without delay during drilling, which may provide a means of quality control (QC) for validating an accurate along-hole depth measurement.

In various applications, pipe tally system 1150 may support methods for performing automated pipe tally and along hole depth measurement, including at least the following operations and capabilities:

counting and maintaining an accurate record of an exact number of pipes entering and exiting borehole 106 at all times during drilling;

performing a pipe tally without user intervention or user input in an automated manner;

generating without delay an estimate of a true length of a section of drill string 146 under tension, or a true length of a drill pipe 144 under tension;

enabling accurate pipe tally for variously sized drilling equipment;

enable improved positioning of drill string 146 in borehole 106;

enable an improved landing point estimate; and enable an improved likelihood of geologically hitting the pay zone and increasing production.

In various embodiments, pipe tally system 1150 may support methods for counting a number of joint portions 1126 of drill string 146 in order to estimate a number of drill pipes 144 entering or exiting borehole 106. Pipe tally system 1150 may continuously or substantially continuously measure an outer diameter of drill string 146 during drilling operations using sliding blocks 1306 and proximity sensor 1318. In this manner, certain gross errors that otherwise may occur in the field associated with measuring a true along hole depth may be substantially reduced or eliminated using pipe tally system 1150, as disclosed herein. It is noted that proximity sensor 1318 may be a draw wire displacement type sensor in particular embodiments. In other embodiments, different types of proximity sensors may be used, such as linear variable differential transformers (LVDT), laser proximity sensors, ultrasonic sensors, mechanical proximity sensors, optical sensors, among others.

In various embodiments, pipe tally system 1150 may support methods for estimating a true displacement drill string 146 by identifying and compensating for downward and upward motion of travelling block 1102. In this manner, certain random errors that otherwise may occur in the field associated with estimating a motion of travelling block 1102 may be substantially reduced or eliminated using pipe tally system 1150, as disclosed herein. For example, travelling block velocity measurement system 2000 and velocity measurement process 2100, as described above, may be used to derive a linear displacement of travelling block 1102.

In various embodiments, pipe tally system 1150 may support methods for estimating a true length of drill pipe 146, or portions thereof, under tension by correlating crown sensor measurements with measurements obtained using pipe tally system 1150. In this manner, certain systematic errors that otherwise may occur in the field associated with estimating a motion of travelling block 1102 may be substantially reduced or eliminated using pipe tally system 1150, as disclosed herein.

In particular embodiments, pipe tally system 1150 may support methods for providing an unambiguous zero reference point for a true length of drill pipe 146, or portions thereof, under tension by correlating crown sensor measurements by virtue of a fixed point of physical installation of pipe tally system 1150. For example, in conventional pipe tally, typically the zero reference point is at the rig floor and is used by personnel counting a number of drill pipes 144 or a number of drill pipe stands 1106 that enter borehole 106. However, because there is no exact point where such manual pipe tally is typically precisely referenced against, certain errors in along hole depth may be introduced and may propagate throughout the pipe tally in this manner. In contrast, pipe tally system 1150, as disclosed herein, may be mounted at a fixed location relative to borehole 106, and may receive and measure every single drill pipe 144 that is introduced into borehole 106, which is desirable for the improvement in precision of pipe tally.

In various embodiments, pipe tally system 1150 may support methods for improving an accuracy of wellbore positioning and may enable increasing chances that a trajectory of borehole 106 stays in (or reaches) the geological pay zone by eliminating gross errors and by reducing random and systematic errors in the along-hole depth estimate.

In various embodiments, pipe tally system 1150 can be designed and implemented modularly to accommodate additional services and features. Pipe tally system 1150 may be accessible for in field service and maintenance and may comprise standardized parts and components that can be replaced for rapid servicing and a high operational availability, which may be desirable for reliable operation.

In particular embodiments, diameter measurements generated by pipe tally system 1150 may be indicative of local thinning of drill pipe 144 along drill string 146, or other variances in diameter measurements that may enable early identification of damage or deterioration of individual drill pipes 144.

In some embodiments, additional drill pipe inspection equipment may be used with pipe tally system 1150 or may be installed with pipe tally system 1150. For example, at least one of the following types of testing equipment may be installed with pipe tally system 1150 in proximity of drill pipe 144:
  piezoelectric accelerometers for vibration analysis;
  infrared sensors, laser profilometer to detect surface flaws, corrosion damage, voids; and
  ultrasonic sensors to detect internal cracks in drill pipe steel.

Figure 22:
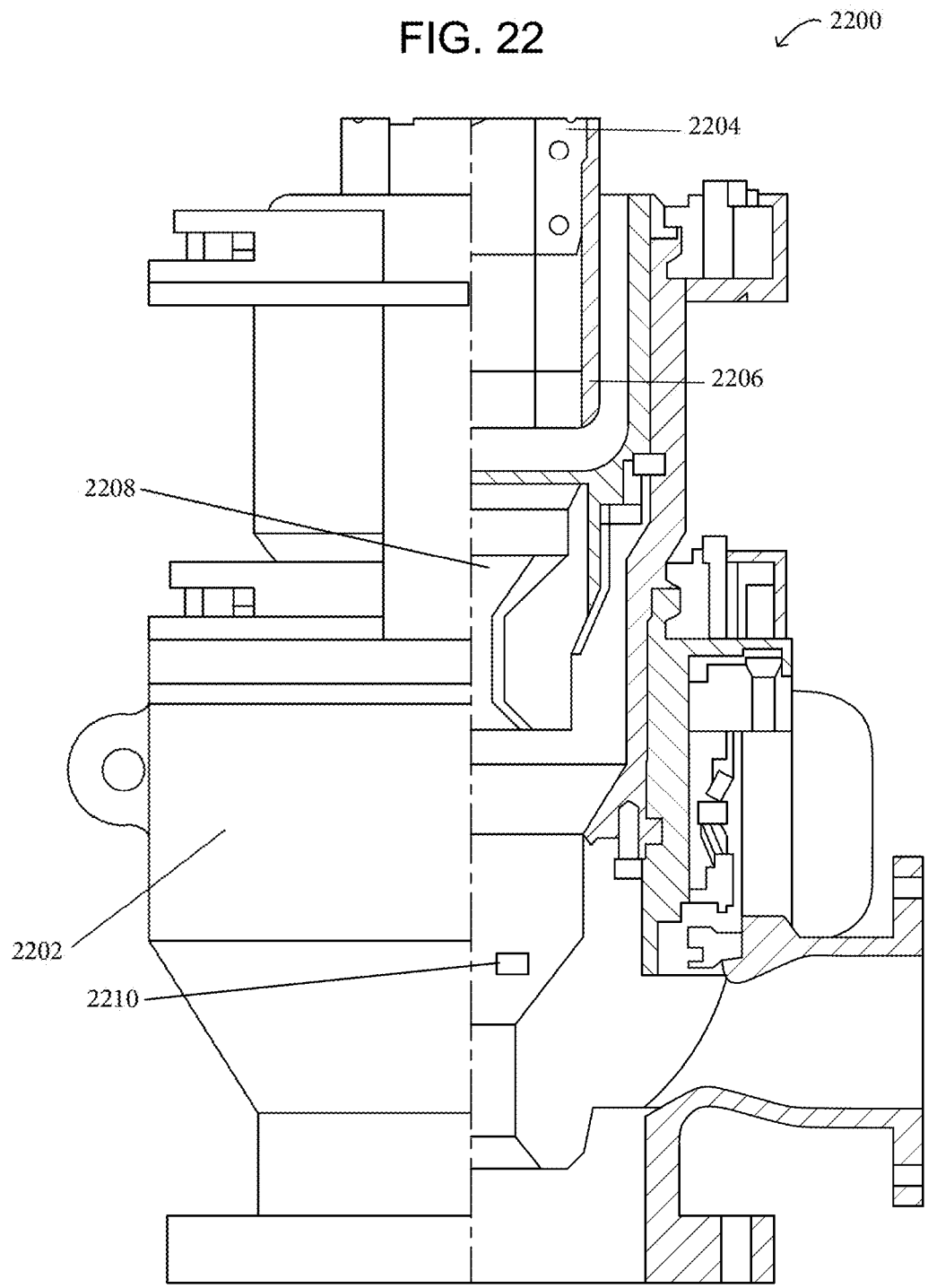
FIG. 22 illustrates a rotating drilling head including devices for a pipe tally system.

FIG. 22 illustrates a rotating drilling head 2200 including devices for a pipe tally system. The rotating drilling head 2200 is shown in a cut-away view to illustrate components included within the rotating drilling head 2200. The rotating drilling head 2200 may be an example of the rotary table 162 described above, and may include components to enable a pipe tally system, for example in use as a retrofit system to be added to an existing rotating drilling head 2200 or as a rotating drilling head 2200 with integrated pipe tally system. Though described herein with reference to a particular drilling apparatus, the pipe tally system described below is capable of application to any rotating head system including low pressure and high pressure locations in addition to more complex managed pressure drilling (MPD) systems. The rotating drilling head 2200 includes a bowl 2202 that contains the components therein. The rotating drilling head 2200 includes a kelly bushing 2204 at the top of the rotating drilling head 2200, as is well-known to those with skill in the art. Within the rotating drilling head 2200 is also included a drive assembly 2206 for driving rotation of the drilling assembly. Stripper rubbers 2208 are also positioned within the rotating drilling head 2200. The stripper rubbers 2208 seal on the diameter of the drill pipe 144 to seal against the flow of fluids upwards through the drilling head. The stripper rubbers 2208 may be rubber or any other suitable materials used to seal around the drill pipe 144.

The stripper rubber 2208, which in some example may be a single stripper rubber 2208, or any other configuration of stripper rubber 2208 known in the art, includes instrumentation 2210 to measure stress experienced by the stripper rubber 2208. The stripper rubber 2208 is in contact with the drill pipe 144 and must accommodate the joint portion 1126 as described above. Because the joint portion 1126 has a larger diameter than the drill pipe 144, as described above, the stripper rubber 2208 must stretch, expand, or otherwise accommodate the larger diameter of the joint portion 1126 while still remaining in contact with the drill pipe 144 and joint portion 1126 to maintain the seal. The instrumentation 2210 connected to the stripper rubber 2208 can measure the stress, stretch, displacement, deformation, or any other suitable parameter or characteristic describing the expansion of the stripper rubber 2208 as the joint portion 1126 passes through the stripper rubber 2208.

The instrumentation 2210 may measure the stretch, stress, strain, compression, elongation, expansion, or other such parameters associated with the stripper rubber 2208 and convey the measured data to a computing device of a pipe tally system, such as the controller shown and described in FIG. 10. The computing device may determine, based on the data from the instrumentation 2210, as each joint portion 1126 passes through the stripper rubber 2208 to maintain a pipe tally for the drill pipe 144. The computing device may identify peaks or spikes in the data and correlate such peaks with stress on the stripper rubber 2208 as the joint portion 1126 passes through the stripper rubber 2208. In some examples, the computing device may identify each joint portion 1126 passing through the stripper rubber 2208 based on the stress data, or other data, exceeding a threshold. The threshold may server to avoid false positives that may be a result of perturbations to the stripper rubber 2208 for any reason other than a joint portion 1126 passing through. For example, vibrations, rotations, foreign matter, and other such disturbances may result in stress on the stripper rubber 2208, but will not result in a pipe tally count unless the threshold is reached, indicating a joint portion 1126 has passed.

In some examples, continuous measurement of data from the instrumentation may be useful for evaluating wear of the stripper rubber 2208 or other components and to identify when excess wear or damage has occurred to the stripper rubber 2208 or other components of the rotating drilling head. For instances, trends in the data measured by the instrumentation may indicate that the stripper rubber is experiencing reduced stress levels or other abnormalities that may indicate wear or damage to the components.

The data from the instrumentation 2210 may be conveyed to the computing device over a wired or wireless connection, for example using a wired connection to the computing device or using a BLUETOOTH® enabled chip to relay the instrumentation data wirelessly. Other means and methods of transferring data are also envisioned and intended to be covered by this disclosure, as such data transmission means are well known to those with skill in the art.

In particular, the instrumentation 2210 may include one or more devices to measure, directly or indirectly, the stress, stretch, compression, expansion or other parameters of the stripper rubber 2208. The instrumentation 2210 may, in some examples include a pressure sensor and/or a strain sensor into the stripper rubber 2208. In some examples, the pressure sensor and/or the strain sensor may be applied to the surface of the stripper rubber 2208. In some examples the pressure sensor and/or the strain sensor may be within the wall of the stripper rubber 2208, either inserted or molded within the body of the stripper rubber 2208.

In some examples, the instrumentation 2210 may include features built into the stripper rubber 2208 besides sensors and devices. For example, a groove may be formed in an outer surface of the stripper rubber 2208. The groove may contain air, for example in a chamber with an open end, the chamber formed entirely within the wall of the stripper rubber 2208. As the stripper rubber 2208 is stressed, the air contained within the groove or chamber is forced out, due to the stretch of the stripper rubber 2208 deforming the shape and volume of the chamber. A sensor device within the bowl 2202 may measure the pressure or force of the air forced out of the chamber and convey the data to the computing device for a pipe tally. In such examples, large stresses to the stripper rubber 2208 will result in movement of air within the bowl 2202 and out of the chamber that is detected by the sensor as the joint portion 1126 passes through the stripper rubber 2208.

In some examples, the instrumentation 2210 may include a pressure senor contained within the bowl 2202 or rotating head clamp of the rotating drilling head 2200. As the joint portion 1126 passes through the stripper rubber 2208, the pressure within the bowl 2202 will increase due to the expansion of the stripper rubber 2208. The variations in the pressure within the housing provide markers, similar to the stress data or other data described above, to identify passages of joint portions 1126 though the stripper rubber 2208 of the rotating drilling head 2200.

In some examples, the measurements/data from the instrumentation 2210 may be confirmed against a measuring system to provide a confirmation of the pipe tally system and thereby increase the confidence of the pipe tally system. For example, a drilling system 100 may include a computer vision system, including one or more camera systems (e.g., still, video, 2D, or 3D), with the computer vision system cameras positioned to provide a field of view that includes the drill string or drill pipe (such as when connected to form a stand). The computer vision system with this field of view can also determine a pipe tally, and may also provide a length of each stand or piece of pipe, as well as its velocity, entering and/or leaving the borehole. The computer vision applications may be used to identify the joint portion 1126 using computer vision methods and systems. In some examples, the computer vision application and the pipe tally system may each be used and connected to each other and/or the same computing system, such as a part of the steering control system 168, a part of the rig controls system 500, a part of the drilling system 100, included with the controller 1000, or may be a similar or different computer system and may be coupled to one or more of the foregoing systems. The use of the pipe tally system described and disclosed herein in combination with a computer vision system can be used to provide more accurate information and greater confidence in the information provided. Examples of such computer vision systems and methods are described in U.S. Patent Publication 2020/0126386, titled "Systems and Methods for Oilfield Drilling Operations Using Computer Vision," and U.S. Patent Publication 2019/0385298, titled "Oil Rig Drill Pipe and Tubing Tally System," the entirety of each of which is hereby incorporated by reference in their entirety for all purposes.

The joint portion 1126 may also be recognized, according to the methods and systems described herein while transitioning into the rotating drilling head 2200, to avoid error readings with respect to WOB readings. In some examples, the resistance of the stripper rubber 2208 as the joint portion 1126 passes through the stripper rubber 2208 may, in typical systems, be misinterpreted as a hang-up or problem with the BHA downhole. Using the information from the pipe tally system, such resistance as measured and shown with respect to the WOB as a result of the larger diameter of the joint portion 1126 may be accounted for and not result in downtime or trouble shooting for problems at the BHA, when no problems exist at the BHA and the perceived WOB error is only due to the resistance at the stripper rubber 2208. Due to the difficulty of placing optical sensors beneath the rotating drilling head 2200, the instrumentation 2210 of the pipe tally system may provide these benefits of accounting for and discounting potential WOB errors not otherwise available using different pipe tally systems alone, such as computer vision systems alone.

In some examples, when running autoslide, a pipe tally system such as the mechanical system shown in FIG. 13 or other tally systems and/or rotary heads may result in introduced errors to the WOB, for example increasing a WOB reading while inserting into the borehole and decreasing the WOB on the way out of the borehole. This error may be introduced due to the additional force required to introduce the drill pipe joint through a tally mechanism, rotary head, or other such device. In some examples, the WOB may be corrected or adjusted based on such known potential errors by correcting a WOB measurement when a drill pipe joint passes through a constricted area, such as a pipe tally mechanism. Using computer vision techniques, described above, or pipe tally data indicating when a joint enters or exits the constriction as well as the direction of movement of the drill pipe, into or out of the borehole, the WOB can be adjusted while the joint passes through the constriction to provide more accurate WOB readings. Force required to insert and remove drill pipe joints may be empirically known and measured and used to adjust the WOB readings in real-time as needed. In some examples, the WOB correction may be accomplished due to a pre-programmed or determined distance between joints, and subsequently automatically correcting the WOB data after the drilling pipe has traversed the distance between joints rather than based on affirmative detection of the joints through sensors, pipe tally devices, or computer vision systems.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A pipe tally system for determining a number of drill pipes entering or exiting a borehole, the pipe tally system comprising:
    a sliding block positioned adjacent a drill pipe inlet such that drill pipes entering or exiting the borehole pass through the drill pipe inlet, wherein the sliding block is configured to slide along an axis perpendicular to an opening of the drill pipe inlet, and wherein the sliding block has a top surface that is inclined with respect to a longitudinal axis of the drill pipes passing through the drill pipe inlet;

a spring element positioned against the sliding block to apply a force against the sliding block in a first direction parallel to the axis of the sliding block and cause the sliding block to remain in contact with a drill pipe entering or exiting the borehole;

a position sensor adjacent the sliding block to detect a position of the sliding block;

a processor; and a non-transitory memory having instructions stored thereon that, when executed by the processor, cause the processor to:

receive first position data from the position sensor indicating a first position of the sliding block while the drill pipe is at a first height;

receive second position data from the position sensor indicating a second position of the sliding block while the drill pipe is at a second height;

determine a first drill pipe diameter based on the first position data;

determine a second drill pipe diameter based on the second position data; and update a pipe tally for a drill string responsive to determining a drill pipe has entered or exited the drill pipe inlet in response to the first drill pipe diameter differing from the second drill pipe diameter.

2. The pipe tally system of claim 1, wherein the instructions for determining the drill pipe has entered or exited the drill pipe inlet comprise further instructions that, when executed by the processor, cause the processor to:

determine the first drill pipe diameter and the second drill pipe diameter differ by at least a predetermined threshold; and determine a drill pipe joint has passed through the drill pipe inlet in response to the first drill pipe diameter and the second drill pipe diameter differing by at least the predetermined threshold.

3. The pipe tally system of claim 1, wherein the position sensor comprises a proximity sensor.

4. The pipe tally system of claim 3, wherein the proximity sensor comprises one of at least: a draw wire displacement sensor, a linear variable differential transformer, a laser proximity sensor, an ultrasonic sensor, a mechanical proximity sensor, and an optical sensor.

5. The pipe tally system of claim 1, further comprising:

a second sliding block positioned adjacent the drill pipe inlet and the sliding block, configured to slide the axis perpendicular to the opening of the drill pipe inlet;

a second spring element positioned against the second sliding block to apply a force against the second sliding block parallel to the axis of the sliding block in a second direction opposite the first direction;

a second position sensor adjacent the second sliding block to detect a position of the second sliding block, and wherein the instructions comprise further instructions that, when executed by the processor, cause the processor to:

receive third position data from the second position sensor indicating a first position of the second sliding block while the drill pipe is at the first height; and receive fourth position data from the second position sensor indicating a second position of the second sliding block while the drill pipe is at the second height, and wherein determining the first drill pipe diameter and second drill pipe diameter are further based on the third position data and the fourth position data.

6. The pipe tally system of claim 1, wherein the instructions comprise further instructions that, when executed by the processor, cause the processor to:

determine a drill pipe has entered the drill pipe inlet based on a first direction of movement of a drill string; and determine a drill pipe has exited the drill pipe inlet based on a second direction of movement of the drill string.

7. The pipe tally system according to claim 1, wherein the pipe tally system is located below a rig floor of a drilling rig drilling the borehole.

8. The pipe tally system according to claim 1, wherein the instructions further comprise instructions for determining, responsive to determining that a drill pipe has entered or exited the drill pipe inlet, a weight on bit (WOB) for drilling operations.

9. The pipe tally system according to claim 1, wherein the instructions further comprise instructions for determining, responsive to determining that a drill pipe has entered or exited the drill pipe inlet, a measured depth for a drill string located in the borehole.

10. The pipe tally system according to claim 1, wherein the instructions further comprise instructions for determining, responsive to determining that a drill pipe has entered or exited the drill pipe inlet, a weight on bit (WOB) for drilling operations and a measured depth for a drill string located in the borehole.

11. The pipe tally system of claim 1, wherein the sliding block further has a bottom surface that is inclined with respect to the longitudinal axis of the drill pipes.

12. The pipe tally system of claim 11, wherein the incline of the bottom surface is steeper than the incline of the top surface.

13. A method of providing a pipe tally for drilling operations, the method comprising:

providing a pipe tally system, the pipe tally system comprising an inlet for pipe entering or exiting the pipe tally system, a sliding block having a top surface that is inclined with respect to a longitudinal axis of the pipe entering or exiting the pipe tally system and biased to contact pipe entering or exiting the pipe tally system and configured to move along an axis perpendicular to an opening of the inlet in response to pipe entering or exiting the pipe tally system, a sensor coupled to the sliding block and configured to provide a signal responsive to a diameter of a pipe entering or exiting the pipe tally system;

determining, by a computer system, a first diameter of a pipe entering or exiting the pipe tally system at a first position of the pipe and a second diameter of the pipe at a second position of the pipe;

responsive to determining the first diameter and the second diameter, determining, by the computer system, if a pipe has entered or exited the pipe tally system; and responsive to determining if a pipe has entered or exited the pipe tally system, updating, by the computer system, a pipe tally for a drill string.

14. The method according to claim 13, wherein the method further comprises:

responsive to the updated pipe tally, determining, by the computer system, an updated weight on bit (WOB) for drilling operations.

15. The method according to claim 13, wherein the method further comprises:

responsive to the updated pipe tally, determining, by the computer system, an updated measured depth for drilling operations.

16. The method according to claim 13, wherein the method further comprises:
 responsive to the updated pipe tally, determining, by the computer system, an updated weight on bit (WOB) for drilling operations; and
 responsive to the updated pipe tally, determining, by the computer system, an updated measured depth for drilling operations.

17. The method according to claim 13, further comprising:
 obtaining, by the computer system, data regarding a motion of the sliding block;
 obtaining, by the computer system, data regarding a speed of travel of a drill string; and
 responsive to the data regarding the motion of the sliding block and the data regarding the speed of travel of the drill string, determining, by the computer system, a velocity along the drill string axis.

18. The method according to claim 13, wherein the sensor comprises a proximity sensor.

19. The method according to claim 13, wherein the pipe tally system comprises a plurality of sliding blocks.

20. The method according to claim 13, wherein the pipe tally system comprises a spring which biases the sliding block to maintain contact with pipe entering or exiting the pipe tally system.

21. The method according to claim 13, wherein the pipe tally system is located below a rig floor of a drilling rig.

22. The method according to claim 13, wherein the sliding block further has a bottom surface that is inclined with respect to the longitudinal axis of the pipe.

23. The method according to claim 22, wherein the incline of the bottom surface is steeper than the incline of the top surface.

\* \* \* \* \*